US011475351B2

(12) United States Patent
Luo et al.

(10) Patent No.: US 11,475,351 B2
(45) Date of Patent: Oct. 18, 2022

(54) SYSTEMS AND METHODS FOR OBJECT DETECTION, TRACKING, AND MOTION PREDICTION

(71) Applicant: UATC, LLC, San Francisco, CA (US)

(72) Inventors: Wenjie Luo, Toronto (CA); Bin Yang, Toronto (CA); Raquel Urtasun, Toronto (CA)

(73) Assignee: UATC, LLC, Mountain View, CA (US)

(*) Notice: Subject to any disclaimer, the term of this patent is extended or adjusted under 35 U.S.C. 154(b) by 944 days.

(21) Appl. No.: 16/124,966

(22) Filed: Sep. 7, 2018

(65) Prior Publication Data

US 2019/0147372 A1 May 16, 2019

Related U.S. Application Data

(60) Provisional application No. 62/635,881, filed on Feb. 27, 2018, provisional application No. 62/586,700, filed on Nov. 15, 2017.

(51) Int. Cl.
*G06N 3/08* (2006.01)
*G06N 20/00* (2019.01)

(52) U.S. Cl.
CPC .............. *G06N 20/00* (2019.01); *G06N 3/08* (2013.01)

(58) Field of Classification Search
CPC ................................. G06N 20/00; G06N 3/08
See application file for complete search history.

(56) References Cited

U.S. PATENT DOCUMENTS 9,471,851 B1 * 10/2016 Cao ...................... G06V 40/172
2012/0197856 A1 * 8/2012 Banka ................. H04L 67/2885
707/706

(Continued)

FOREIGN PATENT DOCUMENTS

CN 105910827 A * 8/2016
WO WO-2010042068 A1 * 4/2010 ............. G06T 7/246

OTHER PUBLICATIONS

Karpathy, A., Toderici, G., Shetty, S., Leung, T., Sukthankar, R. and Fei-Fei, L., 2014. Large-scale video classification with convolutional neural networks. In Proceedings of the IEEE conference on Computer Vision and Pattern Recognition (pp. 1725-1732). (Year: 2014).*

(Continued)

*Primary Examiner* — Michael J Huntley
*Assistant Examiner* — Sung W Lee
(74) *Attorney, Agent, or Firm* — Dority & Manning, P.A.

(57) ABSTRACT

Systems, methods, tangible non-transitory computer-readable media, and devices for object detection, tracking, and motion prediction are provided. For example, the disclosed technology can include receiving sensor data including information based on sensor outputs associated with detection of objects in an environment over one or more time intervals by one or more sensors. The operations can include generating, based on the sensor data, an input representation of the objects. The input representation can include a temporal dimension and spatial dimensions. The operations can include determining, based on the input representation and a machine-learned model, detected object classes of the objects, locations of the objects over the one or more time intervals, or predicted paths of the objects. Furthermore, the operations can include generating, based on the input rep- (Continued)

resentation and the machine-learned model, an output including bounding shapes corresponding to the objects.

19 Claims, 11 Drawing Sheets

(56) References Cited

U.S. PATENT DOCUMENTS

| | | | |
|---|---|---|---|
| 2017/0193390 A1* | 7/2017 | Weston | G06N 3/08 |
| 2018/0157939 A1* | 6/2018 | Butt | H04N 21/44 |
| 2018/0348346 A1* | 12/2018 | Vallespi-Gonzalez | G01S 7/4802 |
| 2018/0348374 A1* | 12/2018 | Laddha | G01S 7/4808 |
| 2019/0049242 A1* | 2/2019 | Adams | G01C 25/00 |
| 2019/0096086 A1* | 3/2019 | Xu | G01S 17/86 |
| 2019/0130569 A1* | 5/2019 | Liu | G06T 5/50 |
| 2019/0188866 A1* | 6/2019 | Mehrseresht | G06N 3/0481 |

OTHER PUBLICATIONS

Böttger, T., Follmann, P. and Fauser, M., Sep. 2017. Measuring the accuracy of object detectors and trackers. In German Conference on Pattern Recognition (pp. 415-426). Springer, Cham. (Year: 2017).*
Alahi, et al., "Social LSTM: Human Trajectory Prediction in Crowded Spaces." In Proceedings of the IEEE Conference on Computer Vision and Pattern Recognition, pp. 961-971, 2016.
Ahuja et al., "Network Flows: Theory, Algorithms, and Applications", Prentice Hall, Upper Saddle River, New Jersey, 1993, 863 pages.
Benfold et al., "Stable Multi-Target Tracking in Real-Time Surveillance Video" Conference on Computer Vision and Pattern Recognition, Colorado Springs, Colorado, Jun. 21-23, 2011, 8 pages.
Berclaz et al., "Multiple Object Tracking Using K-Shortest Paths Optimization", IEEE Transactions on Pattern Analysis and Machine Intelligence, vol. 33, Issue 9, Sep. 2011, 16 pages.
Bernardin et al., "Evaluating Multiple Object Tracking Performance: The Clear Mot Metrics", Journal on Image and Video Processing, vol. 2008, Article ID 246309, Dec. 2008, 10 pages.
Bertsekas et al., "Data Networks", Prentice Hall, Englewood Cliffs, New Jersey, 113 pages.
Birchfield et al., "Multiway Cut for Stereo and Motion with Slanted Surfaces", International Conference on Computer Vision, Kerkyra, Greece, Sep. 20-27, 1999, 7 pages.
Chen, et al., "3D object proposals using stereo imagery for accurate object class detection." IEEE Transactions on Pattern Analysis and Machine Intelligence, 2017.
Chen et al., "Multi-View 3D Object Detection Network for Autonomous Driving", Conference on Computer Vision and Pattern Recognition, Honolulu, Hawaii, Jul. 21-26, 2017, 9 pages.
Choi et al., "A General Framework for Tracking Multiple People from a Moving Camera, IEEE Transactions on Pattern Analysis and Machine Intelligence", vol. 35, Issue 7, Jul. 2013, 16 pages.
Choi et al., "Near-Online Multi-Target Tracking with Aggregated Local Flow Descriptor", International Conference on Computer Vision, Las Condes, Chile, Dec. 11-18, 2015, 9 pages.
Collins et al., "Hybrid Stochastic/Deterministic Optimization for Tracking Sports Players and Pedestrians", European Conference on Computer Vision, Zurich, Switzerland, Sep. 6-12, 2014, 16 pages.
Dai, et al., "R-FCN: Object Detection Via Region-Based Fully Convolutional Networks", In Advances in neural infoimation processing systems, pp. 379-387, 2016.
Feichtenhofer et al., "Detect to Track and Track to Detect", International Conference on Computer Vision, Venice Italy, Oct. 22-29, 2017, 9 pages.
Gaidon et al., "Online Domain Adaptation for Multi-Object Tracking", arXiv:1508-00776v1, Aug. 4, 2015, 13 pages.
Geiger et al., "3D Traffic Scene Understanding from Movable Platforms, IEEE Transactions on Pattern Analysis and Machine Intelligence", vol. 36, Issue 5, May 2014, 14 pages.
Geiger et al., "Are We Ready for Autonomous Driving? The KITTI Vision Benchmark Suite", Conference on Computer Vision and Pattern Recognition, Providence, Rhode Island, Jun. 16-21, 2012, 8 pages.
Gong et al., "Multi-Hypothesis Motion Planning for Visual Object Tracking", International Conference on Computer Vision, Barcelona, Spain, Nov. 6-13, 2011, pp. 619-626.
Gurobi Optimization Inc., "Gurobi Optimizer Reference Manual", 2016, www.gurobi.com/documentation/current/refman.pdf, retrieved on Sep. 18, 2018, 773 pages.
Haeusler et al., "Ensemble Learning for Confidence Measure in Stereo Vision", Conference on Computer Vision and Pattern Recognition, Portland, Oregan, Jun. 23-28, 2013, 8 pages.
He et al., "Mask R-CNN", arXiv:1703.06870v3, Jan. 24, 2018, 12 pages.
Held et al., "Learning to Track at 100 FPS with Deep Regression Networks", arXiv:1604.01802v2, Aug. 16, 2016, 26 pages.
Howard et al., "MobileNets: Efficient Convolutional Neural Networks for Mobile Vision Applications", arXiv:1704.04861v1, Apr. 17, 2017, 9 pages.
Huang et al., "Speed/Accuracy Trade-Offs for Modern Convolutional Object Detectors", Conference on Computer Vision and Pattern Recognition, Honolulu, Hawaii, Jul. 21-26, 2017, 10 pages.
Iandola et al., "Squeezenet: AlexNet-Level Accuracy with 50X Fewer Parameters and <0.5MB Model Size", arXiv:1602.07360v4, Nov. 4, 2016, 13 pages.
Karlsruhe Institute of Technology, "The KITTI Vision Benchmark Suite", http://www.cvlibs.net/datasets/kitti/eval_tracking.php, retrieved on Sep. 18, 2018, 6 pages.
Khan et al., "Efficient Particle Filter-Based Tracking of Multiple Interacting Targets using an MRF-Based Motion Model", International Conference on Intelligent Robots and Systems, Las Vegas, Nevada, Oct. 27-31, 2003, 6 pages.
Kingma et al., "ADAM: A Method for Stochastic Optimization", arXiv:1412.6980v9, Jan. 30, 2017, 15 pages.
Kuo et al., "Multi-Target Tracking by On-Line Learned Discriminative Appearance Models" Conference on Computer Vision and Pattern Recognition, San Francisco, California, Jun. 13-18, 2010, 8 pages.
Leal-Taixé et al., "Learning by Tracking: Siamese CNN for Robust Target Association", Conference on Computer Vision and Pattern Recognition Workshops, Las Vegas, Nevada, Jun. 26-Jul. 1, 2016, 8 pages.
Lee et al., "Distant Future Prediction in Dynamic Scenes with Interacting Agents", Conference on Computer Vision and Pattern Recognition, Honolulu, Hawaii, Jul. 21-26, 2017, 10 pages.
Lee et al., "Multi-Class Multi-Object Tracking Using Changing Point Detection", arXiv:1608.08434v1, Aug. 30, 2016, 16 pages.
Lenz et al., "FollowMe: Efficient Online Min-Cost Flow Tracking with Bounded Memory and Computation", Conference on Computer Vision and Pattern Recognition, Boston, Massachusetts, Jun. 8-10, 2015, 9 pages.
Li, "3D Fully Convolutional Network for Vehicle Detection in Point Cloud",2016, arXiv:1611.08069v2, Jan. 16, 2017, 5 pages.
Li, et al., "Learning to Associate: HybridBoosted Multi-Target Tracker for Crowded Scene", Conference on Computer Vision and Pattern Recognition, Miami Beach, Florida, Jun. 20-25, 2009, 8 pages.
Lin et al., "Focal Loss for Dense Object Detection", arXiv:1708,02002v2, Feb. 7, 2018, 10 pages.
Liu et al., "SSD: Single Shot Multibox detector", arXiv:1512.02325v5, Dec. 29, 2016, 17 pages.
Luo et al., "Efficient Deep Learning for Stereo Matching", Conference on Computer Vision and Pattern Recognition, Las Vegas, Nevada, Jun. 26-Jul. 1, 2016, 9 pages.
Ma et al., "Forecasting Interactive Dynamics of Pedestrians with Fictitious Play", arXiv:1604.01431v3, Mar. 28, 2017, 9 pages.
Ma et al., "Hierarchical Convolutional Features for Visual Tracking", International Conference on Computer Vision, Las Condes, Chile, Dec. 11-18, 2015, pp. 3074-3082.
Mathieu et al., "Deep Multi-Scale Video Prediction Beyond Mean Square Error", arXiv:1511.05440v6, Feb. 26, 2016, 14 pages.

(56) References Cited

OTHER PUBLICATIONS

Milan et al., "Continuous Energy Minimization for Multitarget Tracking", IEEE Transactions on Pattern Analysis and Machine Intelligence, vol. 36, No. 1, Jan. 2014, pp. 58-72.
Milan et al., Detection- and Trajectory-Level Exclusion in Multiple Object Tracking, Conference on Computer Vision and Pattern Recognition, Columbus, Ohio, Jun. 25-27, 2013, 8 pages.
Milan et al., "Online Multi-Target Tracking Using Recurrent Neural Networks", Association for the Advancement of Artificial Intelligence, San Francisco, California, Feb. 4-9, 2017, 8 pages.
Nam et al., "Learning Multi-Domain Convolutional Neural Networks for Visual Tracking", Conference on Computer Vision and Pattern Recognition, Las Vegas, Nevada, Jun. 26-Jul. 1, 2016, pp. 4293-4302.
Osep et al., "Combined Image-and World-Space Tracking in Traffic Scenes", International Conference on Robotics and Automation, Singapore, China, May 29-Jun. 3, 2017, 8 pages.
Pellegrini et al., "You'll Never Walk Alone: Modeling Social Behavior for Multi-Target Tracking", International Conference on Computer Vision, Kyoto, Japan, Sep. 29-Oct. 2, 2009, pp. 261-268.
Redmon et al., "Yolo9000: Better, Faster, Stronger", Conference on Computer Vision and Pattern Recognition, Honolulu, Hawaii, Jul. 21-26, 2017, 9 pages.
Ren et al., "Faster R-CNN: Towards Real-Time Object Detection with Region Proposal Networks", Neural Information Processing Systems, Montreal, Canada, Dec. 7-12, 2015, 9 pages.
Riahi et al., "Multiple Object Tracking Based on Sparse Generative Appearance Modeling" International Conference on Image Processing, Quebec City, Canada, Sep. 27-30, 2015, 5 pages.
Shitrit et al., "Multi-Commodity Network Flow for Tracking Multiple People", IEEE Transactions on Pattern Analysis and Machine Intelligence, vol. 36, Issue 8, Aug. 2014, 14 pages.
Simonyan et al., "Very Deep Convolutional Networks for Large-Scale Image Recognition", arXiv:1409.1556v6, Apr. 10, 2015, 14 pages.
Spyropoulos et al., "Learning to Detect Ground Control Points for Improving the Accuracy of Stereo Matching", Conference on Computer Vision and Pattern Recognition, Columbus, Ohio, Jun. 24-27, 2014, 8 pages.
Srivastava et al., "Unsupervised Learning of Video Representations Using LSTMs", International Conference on Machine Learning, Lille, France, Jul. 6-11, 2015, pp. 843-852.
Tao et al., "Siamese Instance Search for Tracking", Conference on Computer Vision and Pattern Recognition, Las Vegas, Nevada, Jun. 26-Jul. 1, 2016, pp. 1420-1429.
Walker et al., "An Uncertain Future: Forecasting from Static Images Using Variational Autoencoders", arXiv:1606.07873v1, Jun. 25, 2016, 17 pages.
Wang et al., "Learning A Deep Compact Image Representation for Visual Tracking", Advances in Neural Infoimation Processing Systems, Lake Tahoe, Nevada, Dec. 5-10, 2013, pp. 809-817.
Wang et al., "Learning Optimal Parameters for Multi-Target Tracking with Contextual Interactions", International Journal of Computer Vision, vol. 122, No. 3, 2017, pp. 484-501.
Wang et al., "Visual Tracking with Fully Convolutional Networks", International Conference on Computer Vision, Las Condes, Chile, Dec. 11-18, 2015, pp. 3119-3127.
Wu et al., "SqueezeDet: Unified, Small, Low Power Fully Convolutional Neural Networks for Real-Time Object Detection for Autonomous Driving", Honolulu, Hawaii, Jul. 21-26, 2017, 9 pages.
Xiang et al., "Learning to Track: Online Multi-Object Tracking by Decision Making", International Conference on Computer Vision, Las Condes, Chile, Dec. 11-18, 2015, 9 pages.
Yang et al., "An Online Learned CRF Model for Multi-Target Tracking", Conference on Computer Vision and Pattern Recognition, Providence, Rhode Island, Jun. 16-21, 2012, 8 pages.
Yoon et al., "Bayesian Multi-Object Tracking Using Motion Context from Multiple Objects", Winter Conference on Applications of Computer Vision, Waikoloa Beach, Hawaii, Jan. 6-9, 2015, 8 pages.
Yoon et al., "Online Multi-Object Tracking via Structural Constraint Event Aggregation", Conference on Computer Vision and Pattern Recognition, Las Vegas, Nevada, Jun. 26-Jul. 1, 2016, 9 pages.
Zbontar et al., "Computing the Stereo Matching Cost with a Convolutional Neural Network", Conference on Computer Vision and Pattern Recognition, Boston, Massachusetts, Jun. 8-10, 2015, 8 pages.
Zhang et al., "Global Data Association for Multi-Object Tracking Using Network Flows" Conference on Computer Vision and Pattern Recognition, Anchorage, Alaska, Jun. 23-28, 2008, 8 pages.

* cited by examiner

SYSTEMS AND METHODS FOR OBJECT DETECTION, TRACKING, AND MOTION PREDICTION

RELATED APPLICATION

The present application is based on and claims benefit of U.S. Provisional Patent Application No. 62/586,700 having a filing date of Nov. 15, 2017 and U.S. Provisional Patent Application No. 62/635,881 having a filing date of Feb. 27, 2018, which are incorporated by reference herein.

FIELD

The present disclosure relates generally to the operation of computing systems and devices including detection, tracking, and motion prediction of objects.

BACKGROUND

Various computing systems including autonomous vehicles, robotic systems, and personal computing devices can receive sensor data from various sensors that detect the state of the environment surrounding the computing system. However, the state of the environment is subject to change over time as different objects enter the environment and the state of the respective objects also changes. Further, as the computing system encounters a variety of environments, different operational demands are imposed on the computing system.

Accordingly, there exists a demand for a computing system that is able to more effectively and safely provide information about a variety of different environments.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of object detection, tracking, and motion prediction. The computer-implemented method can include receiving, by a computing system including one or more computing devices, sensor data including information based at least in part on one or more sensor outputs associated with detection of an environment over one or more time intervals by one or more sensors. Further, the environment can include one or more objects. The method can include generating, by the computing system, based at least in part on the sensor data, an input representation of the one or more objects. The input representation can include a temporal dimension and one or more spatial dimensions. The method can include determining, by the computing system, based at least in part on the input representation and a machine-learned model, at least one of one or more detected object classes of the one or more objects, one or more locations of the one or more objects over the one or more time intervals, or one or more predicted paths of the one or more objects. Furthermore, the method can include generating, by the computing system, based at least in part on the input representation and the machine-learned model, output data including one or more bounding shapes corresponding to the one or more objects.

Another example aspect of the present disclosure is directed to one or more tangible non-transitory computer-readable media storing computer-readable instructions that when executed by one or more processors cause the one or more processors to perform operations. The operations can include receiving sensor data including information based at least in part on one or more sensor outputs associated with detection of an environment over one or more time intervals by one or more sensors. The environment can include one or more objects. The operations can include generating, based at least in part on the sensor data, an input representation of the one or more objects. The input representation can include a temporal dimension and one or more spatial dimensions. The operations can include determining, based at least in part on the input representation and a machine-learned model, at least one of one or more detected object classes of the one or more objects, one or more locations of the one or more objects over the one or more time intervals, or one or more predicted paths of the one or more objects. Furthermore, the operations can include generating, based at least in part on the input representation and the machine-learned model, an output including one or more bounding shapes corresponding to the one or more objects.

Another example aspect of the present disclosure is directed to a computing device including one or more processors and one or more non-transitory computer-readable media storing instructions that when executed by the one or more processors cause the one or more processors to perform operations. The operations can include receiving sensor data including information based at least in part on one or more sensor outputs associated with detection of an environment over one or more time intervals by one or more sensors. Further, the environment can include one or more objects. The operations can include generating, based at least in part on the sensor data, an input representation of the one or more objects. The input representation can include a temporal dimension and one or more spatial dimensions. The one or more operations can include determining, based at least in part on the input representation and a machine-learned model, one or more detected object classes of the one or more objects, at least one of one or more locations of the one or more objects over the one or more time intervals, or one or more predicted paths of the one or more objects. Furthermore, the operations can include generating, based at least in part on the input representation and the machine-learned model, an output including one or more bounding shapes corresponding to the one or more objects.

Other example aspects of the present disclosure are directed to other systems, methods, vehicles, apparatuses, tangible non-transitory computer-readable media, and devices for the detection, tracking, and motion prediction of objects. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
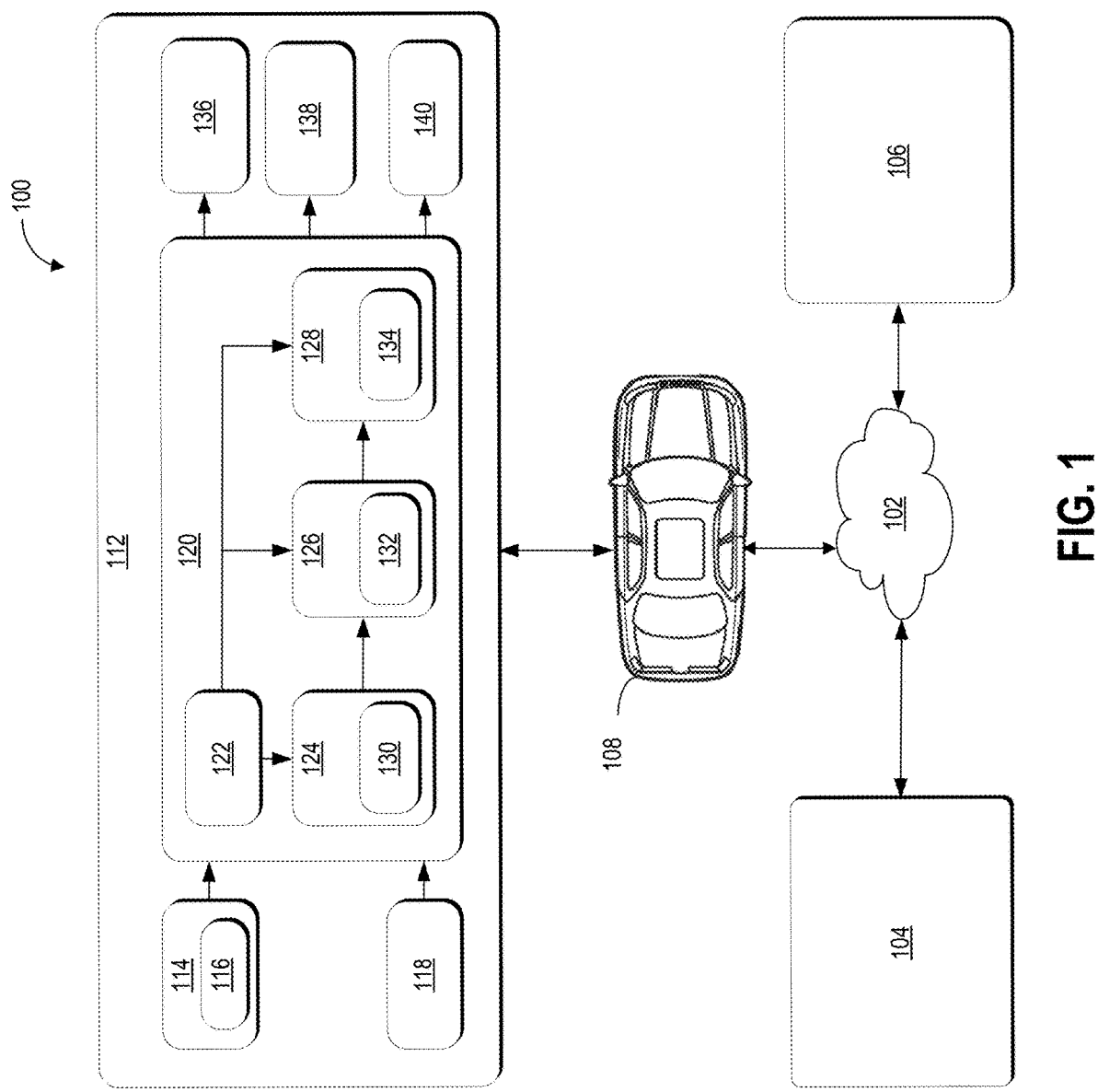
FIG. 1 depicts a diagram of an example system according to example embodiments of the present disclosure.

Example aspects of the present disclosure are directed to detecting, tracking, and/or predicting the movement of one or more objects (e.g., vehicles, pedestrians, and/or cyclists) in an environment proximate (e.g., within a predetermined distance and/or within a sensor field of view) to a device or system including a computing system, a vehicle (e.g., an autonomous vehicle, a semi-autonomous vehicle, or a manually operated vehicle), and/or one or more robotic systems. Further, the detection, tracking, and/or prediction can be accomplished through use of sensor output (e.g., one or more light detection and ranging (LIDAR) device outputs, sonar outputs, radar outputs, and/or camera outputs) and a machine-learned model (e.g., a machine-learned model trained to detect, track, and/or predict the motion of one or more objects). More particularly, aspects of the present disclosure include receiving sensor data associated with the detection of objects (e.g., objects proximate to a vehicle); generating an input representation (e.g., a plurality of voxels) based on the sensor data; determining, based on the input representation and a machine-learned model one or more objects classes, object travel paths, and/or predicted travel paths; and generating bounding shapes (e.g., bounding boxes) that correspond to the detected objects.

For example, a computing system associated with an autonomous vehicle can receive data including sensor data associated with one or more states (e.g., physical dimensions and/or location) of an environment including one or more objects. The sensor data can be collected from one or more sensors of a device (e.g., a manually operated vehicle, an autonomous vehicle, or a robotic system) so that the one or more objects are detected and can be perceived from a birds eye (e.g., top down) vantage point. The birds eye vantage point (e.g., birds eye view) allows the computing system to more readily capture useful information about the spatial relations between the one or more objects, thereby allowing for more effective processing of the sensor data when the sensor data is quantized and later input to a machine-learned model.

The sensor data can then be quantized into a voxel representation that can be used as input for a machine-learned model. The voxel representation can be used to filter out the sparse areas of the environment (e.g., the areas that do not include objects). The voxel representation can be used as an input representation that is input into a machine-learned mode that is trained to detect (e.g., detect the class of an object), track (e.g., track the motion of an object), and determine the predicted travel path of the one or more objects. Significantly, the computing system associated with a device (e.g., an autonomous vehicle and/or a robotic system) can perform the detection, tracking, and motion path prediction of the objects in a single stage (e.g., simultaneously), which can reduce the accumulation of errors that can occur when the detection, tracking, and motion path prediction are performed sequentially. The computing system associated with the device (e.g., an autonomous vehicle) can then generate one or more bounding shapes (e.g., bounding polygons) that can be used to identify the one or more objects (e.g., size, shape, and/or type) and furthermore to indicate an orientation or travel direction of the one or more objects. Accordingly, the disclosed technology allows for an improvement in operational safety through faster, more accurate, and precise object detection, tracking, and motion prediction that more efficiently utilizes computing resources.

The system in the disclosed technology can include one or more vehicles, one or more robotic systems, and/or one or more computing systems (e.g., a computing system including one or more computing devices with one or more processors and a memory) that can be used to perform one or more operations including controlling a variety of vehicle systems, vehicle components, robotic systems, and/or computing systems. Further, the computing system can process, generate, and/or exchange (e.g., send or receive) signals or data, including signals or data exchanged with various vehicle systems, vehicle components, robotic systems, vehicles, or remote computing systems.

For example, the computing system can exchange one or more signals (e.g., electronic signals) or data with one or more vehicle systems including one or more sensor systems (e.g., sensors that generate output based on detection of changes in the state of the physical environment external to the vehicle, including LIDAR, cameras, microphones, radar devices, thermal sensors, and/or sonar devices); communication systems (e.g., wired and/or wireless communication systems that can exchange signals or data with other devices); navigation systems (e.g., devices that can receive signals from GPS, GLONASS, or other systems used to determine a vehicle's geographical location); notification systems (e.g., devices used to provide notifications to other vehicles and/or pedestrians, including display devices, status indicator lights, and/or audio output devices); braking systems used to slow down the vehicle (e.g., brakes of the vehicle including mechanical and/or electric brakes); propulsion systems used to provide power for the vehicle to move from one location to another (e.g., motors and/or engines including electric engines and/or internal combustion engines); and/or steering systems used to change the path, course, and/or direction of travel of the vehicle.

The computing system can access a machine-learned model that has been generated and/or trained in part using training data including a plurality of classified features and a plurality of classified object labels. In some embodiments, the plurality of classified features can be extracted from point cloud data that includes a plurality of three-dimensional points associated with one or more sensor outputs from one or more sensors (e.g., one or more LIDAR devices and/or cameras).

When the machine-learned model has been trained, the machine-learned model can associate the plurality of classified features with one or more classified object labels that are used to classify and/or categorize objects including objects that are not included in the plurality of training objects. In some embodiments, as part of the process of training the machine-learned model, the differences in correct classification output between a machine-learned model (that outputs the one or more classified object labels) and a set of classified object labels associated with a plurality of training objects that have previously been correctly identified (e.g., ground truth labels), can be processed using an error loss function that can determine a set of probability distributions based on repeated classification of the same plurality of training objects. As such, the effectiveness (e.g., the rate of correct identification of objects) of the machine-learned model can be improved over time.

The computing system can access the machine-learned model in various ways including exchanging (sending and/or receiving via a network) data or information associated with a machine-learned model that is stored on a remote computing device; and/or accessing a machine-learned model that is stored locally (e.g., in one or more storage devices of the computing device or associated device including a vehicle or robotic system).

The plurality of classified features can be associated with one or more values that can be analyzed individually and/or in various aggregations. The analysis of the one or more values associated with the plurality of classified features can include determining a mean, mode, median, variance, standard deviation, maximum, minimum, and/or frequency of the one or more values associated with the plurality of classified features. Further, the analysis of the one or more values associated with the plurality of classified features can include comparisons of the differences or similarities between the one or more values. For example, the one or more objects associated with a pedestrian can be associated with a range of physical dimensions that are different from the range of physical dimensions associated with a vehicle (e.g., an automobile, and/or a truck).

In some embodiments, the plurality of classified features can include a range of physical dimensions associated with the plurality of training objects, a range of accelerations associated with the plurality of training objects, a range of velocities associated with the plurality of training objects, and/or a range of shapes associated with the plurality of training objects. The plurality of classified features can be based in part on the output from one or more sensors that have captured a plurality of training objects (e.g., actual objects used to train the machine-learned model) from various angles and/or distances in different environments (e.g., urban areas, suburban areas, rural areas, heavy traffic, and/or light traffic) and/or environmental conditions (e.g., bright daylight, rainy days, darkness, snow covered roads, inside parking structures, in tunnels, and/or under streetlights). The one or more classified object labels can then be used to classify and/or categorize the one or more objects, including one or more buildings, roads, city streets, highways, sidewalks, bridges, overpasses, waterways, pedestrians, automobiles, trucks, natural geographic formations, and/or cyclists.

In some embodiments, the classifier data can be based in part on a plurality of classified features extracted from sensor data associated with output from one or more sensors associated with a plurality of training objects (e.g., previously classified pedestrians, automobiles, buildings, and/or cyclists). The sensors used to obtain sensor data from which features can be extracted can include one or more LIDAR devices, one or more radar devices, one or more sonar devices, and/or one or more image sensors.

The machine-learned model can be generated based at least in part on one or more classification processes or classification techniques. The one or more classification processes and/or classification techniques can include one or more computing processes performed by one or more computing devices based in part on sensor data associated with physical outputs from a sensor device. The one or more computing processes can include the classification (e.g., allocation and/or sorting into different groups or categories) of the physical outputs from the sensor device, based in part on one or more classification criteria (e.g., set of physical dimensions, shape, orientation, size, velocity, and/or acceleration associated with an object).

The machine-learned model can compare the sensor data to the classifier data based in part on one or more sensor outputs captured from the detection of one or more classified objects (e.g., thousands or millions of objects) in various environments or conditions. Based on the comparison, the computing system can determine one or more properties and/or attributes of the one or more objects. The one or more properties and/or attributes can be mapped to, or associated with, one or more object classes based in part on one or more classification criteria.

For example, one or more classification criteria can distinguish a vehicle class from a pedestrian class based in part on their respective sets of features. The vehicle class can be associated with one set of size features (e.g., a size range of ten cubic meters to forty cubic meters) and a pedestrian class can be associated with a different set of size features (e.g., a size range of less than two cubic meters). Further, the velocity and/or acceleration of detected objects can be associated with different object classes (e.g., pedestrian velocity will not exceed fifty kilometers per hour and a vehicle's velocity can be greater than one-hundred and fifty kilometers per hour).

In some embodiments, the machine-learned model can be generated based at least in part on training data including a plurality of training objects associated with a plurality of classified features and a plurality of classified object labels. The plurality of classified features can be based at least in part on point cloud data (e.g., point cloud data based on one or more sensor outputs including LIDAR outputs) that includes a plurality of three-dimensional points (e.g., x, y, and z coordinates) associated with one or more physical characteristics (e.g., physical dimensions) of the plurality of training objects.

In some embodiments, the machine-learned model can be trained using training data that includes a plurality of predefined portions of a training environment (e.g., a plurality of predefined areas of the training environment). Each of the plurality of predefined portions of the training environment can be associated with at least one of a plurality of negative training samples (e.g., training samples that do not belong to any of the classes of the one or more objects) or at least one of a plurality of positive training samples (e.g., training samples that do belong to any of the classes of the one or more objects) associated with a corresponding ground truth sample.

The computing system can determine, for each of the plurality of predefined portions of the training environment, a score (e.g., a numerical score) associated with a probability of the predefined portion of the plurality of predefined portions being associated with one of the plurality of classified object labels. For example, the computing system can determine, that one of the plurality of predefined portions of the training environment has a ninety percent (90%) probability of being associated with a vehicle object label (e.g., the predefined portion of the training environment has a ninety percent probability of containing a vehicle).

The computing system can then rank, the plurality of negative training samples based on the score for the respective one of the plurality of predefined portions of the training environment. Furthermore, the weighting of a filter of the machine-learned model can be based at least in part on a predetermined portion of the plurality of the negative samples associated with the lowest scores. For example, the lowest ranking negative samples of the plurality of negative samples can be used to improve filter performance by providing an example of a sample that is not a positive training sample.

The computing system can receive sensor data including information based at least in part on one or more sensor outputs associated with detection of an environment (e.g., an environment including one or more objects) over one or more time intervals (e.g., one or more time frames) by one or more sensors of a vehicle. The one or more objects can include, by way of example, one or more vehicles, one or more pedestrians, one or more cyclists, one or more roads, one or more buildings, one or more walls, cargo, one or roe pieces of furniture, and/or one or more natural geographic formations. Further, the sensor data can be based at least in part on one or more sensor outputs associated with one or more physical properties and/or attributes of the one or more objects. The one or more sensor outputs can be associated with the shape, color, position, orientation (e.g., bearing), texture, velocity, acceleration, and/or physical dimensions (e.g., width, depth, and/or height) of the one or more objects and/or portions of the one or more objects (e.g., a rear portion of the one or more objects that is facing away from the vehicle). For example, the computing system can receive sensor data from one or more sensors on (e.g., one or more LIDAR devices, one or more cameras, one or more microphones, one or more radar devices, one or more sonar devices, and/or one or more thermal imaging devices) of a vehicle, computing device, and/or robotic system. In some embodiments, the sensor data can include LIDAR data (e.g., LIDAR point cloud data) associated with the three-dimensional locations and/or positions of one or more objects detected by one or more LIDAR devices.

In some embodiments, the one or more sensor outputs can include one or more three-dimensional points corresponding to a plurality of surfaces of the one or more objects detected by the one or more sensors (e.g., the surfaces of vehicles). The one or more three-dimensional points associated with surfaces of the one or more objects detected by the one or more sensors can include one or more x, y, and z coordinates. For example, one or more sensors including one or more LIDAR devices can detect the surfaces of objects (e.g., other vehicles, cyclists, and/or pedestrians) proximate to a device (e.g., a vehicle) and generate one or more sensor outputs including a plurality of three-dimensional points corresponding to the surfaces of the detected objects.

In some embodiments, at least one of the one or more sensors is positioned on a portion of an associated device (e.g., the roof of an autonomous vehicle or the uppermost portion of a robotic system) that provides a bird's eye view (e.g., a top down perspective) of the one or more objects to the one or more sensors. Further, the one or more sensors can include one or more LIDAR devices, one or more cameras (e.g., one or more optical cameras), one or more radar devices, one or more sonar devices, and/or one or more thermal sensors.

The computing system can generate, based at least in part on the sensor data, an input representation of the one or more objects (e.g., data that includes an input representation of the sensor data that can be used as input for a machine-learned model). For example, the input representation can include and/or be associated with one or more data structures that can be used to represent one or more objects including voxels and/or pixels. The input representation can include a temporal dimension (e.g., a dimension associated with one or more time intervals) and/or one or more spatial dimensions (e.g., one or more dimensions associated with one or more physical dimensions).

In some embodiments, the computing system can generate, based at least in part on the sensor data, a plurality of voxels corresponding to the environment including the one or more objects. For example, the computing system can quantize the sensor data into the plurality of voxels. A height dimension of the plurality of voxels can be used as an input channel of the input representation. In some embodiments, the input representation (e.g., input representation data input into a machine-learned model) can be based at least in part on the plurality of voxels corresponding to one or more portions of the environment occupied by the one or more objects (e.g., the input representation excludes the plurality of voxels that are not occupied by the one or more objects). In this way, computational resources can be more effectively utilized by not using empty (e.g., non-object) portions of the environment as input for a machine-learned model.

In some embodiments, the input representation includes a tensor associated with a set of dimensions including the temporal dimension and the one or more spatial dimensions. The temporal dimension of the tensor can be associated with the one or more time intervals. Further, the one or more spatial dimensions of the tensor can include a width dimension, a depth dimension, and/or a height dimension that is used as an input channel (e.g., a grayscale channel) for the machine-learned model.

The computing system can determine, based at least in part on the input representation and a machine-learned model, one or more detected object classes (e.g., a class or type associated with an object) of the one or more objects, one or more locations (e.g., geographical locations including latitude and longitude) of the one or more objects over the one or more time intervals, and/or one or more predicted paths (e.g., travel paths) of the one or more objects. For example, the machine-learned model can be based at least in part on one or more classification techniques including linear regression, logistic regression, a convolutional neural network, a feed forward neural network, a recurrent neural network, and/or a radical basis neural network.

In some embodiments, the computing system can input the input representation (e.g., send data associated with the input representation via a communication channel) to a first convolution layer of a plurality of convolution layers of the machine-learned model (e.g., a machine-learned model that includes a convolutional neural network). Further, weights of a plurality of feature maps (e.g., the parameters of the feature maps) for each of the plurality of convolution layers can be shared between the plurality of convolution layers.

In some embodiments, the computing system can, as the input representation is processed by the plurality of convolution layers, aggregate temporal information to the tensor (e.g., add temporal information associated with the temporal dimension of the tensor) subsequent to aggregating spatial information associated with the one or more spatial dimensions to the tensor (e.g., adding data associated with spatial information to tensor data).

In some embodiments, the temporal information associated with the temporal dimension can be aggregated at the first convolution layer of the plurality of convolution layers. Further, in some embodiments, aggregating the temporal information can include the computing system reducing the one or more time intervals of the temporal dimension to one time interval by performing a one-dimensional convolution on the temporal information associated with the temporal dimension.

In some embodiments, the temporal information associated with the temporal dimension of the tensor can be aggregated over two or more convolution layers of the plurality of convolution layers. Further, in some embodiments, aggregating the temporal information can include reducing the one or more time intervals of the temporal dimension to one time interval by performing a two-dimensional convolution on the temporal information associated with the temporal dimension.

The computing system can generate, based at least in part on the input representation and the machine-learned model, output data including one or more bounding shapes corresponding to the one or more objects (e.g., one or more locations of the one or more objects). The one or more bounding shapes (e.g., two-dimensional and/or three-dimensional bounding ellipsoids, bounding polygons, and/or bounding boxes) that surround one or more areas, volumes, sections, or regions associated with one or more areas of the input representation (e.g., the input representation associated with physical dimensions of the one or more objects in the environment). The one or more bounding shapes can include one or more quadrilaterals (e.g., rectangles) that surround a portion or the entirety of the one or more objects. For example, the one or more bounding shapes can enclose the one or more objects that are detected by the one or more sensors (e.g., LIDAR devices) onboard a device associated with the computing system (e.g., a vehicle or robotic system).

In some embodiments, the computing system can determine, based at least in part on the input representation and the machine-learned model, an amount of overlap between the one or more bounding shapes (e.g., the amount by which a pair of the one or more bounding shapes intersect and/or overlap). Further, the computing system can determine whether, when, or that, an amount of overlap between the one or more bounding shapes satisfies one or more overlap criteria. For example, the one or more overlap criteria can include an overlap criteria associated with a threshold value for intersection over union of two or more objects.

Responsive to the one or more overlap criteria being satisfied, the computing system can determine that the object of the one or more objects associated with the one or more bounding shapes that satisfy the one or more overlap criteria is the same object over the one or more time intervals. For example, the computing system can determine that when the intersection over union of two bounding shapes exceeds twenty percent, that the two bounding shapes enclose the same object.

In some embodiments, the computing system can activate, based at least in part on the output data, one or more vehicle systems associated with operation of the vehicle. For example, the computing system can perform one or more motion planning operations (e.g., planning a travel path of a vehicle or robotic system) based on the output data (e.g., the output data that includes the class, location, and predicted travel path of one or more objects proximate to the vehicle or robotic system).

By way of further example, the computing system can activate one or more vehicle systems including one or more communication systems that can exchange (send and/or receive) signals or data with other vehicle systems, other vehicles, or remote computing devices; one or more lighting systems (e.g., one or more headlights, hazard lights, and/or vehicle compartment lights); one or more vehicle safety systems (e.g., one or more collision avoidance systems); one or more notification systems that can generate one or more notifications for passengers of the vehicle (e.g., auditory and/or visual messages about the state or predicted state of the vehicle); braking systems (e.g., slowing the vehicle as the vehicle rounds a corner); propulsion systems (e.g., changing the amount of power that is output from engines and/or motors of the vehicle) that can be used to change the acceleration and/or velocity of the vehicle; and/or steering systems that can change the path, course, and/or direction of travel of the vehicle.

The computing system can determine one or more traveled paths (e.g., one or more previously traveled paths) of the one or more objects based at least in part on one or more locations of the one or more objects over a sequence of the one or more time intervals including a last time interval associated with a current time and the one or more time intervals prior to the current time (e.g., one or more past points in time). In some embodiments, the one or more predicted paths of the one or more objects can be based at least in part on the one or more traveled paths of the one or more objects.

In some embodiments, the computing system can detect an object (e.g., one of the one or more objects) that is at least partly occluded (e.g., blocked and/or obstructed). For example, the object can include a cyclist that is partly obstructed by a truck that is passing in front of the cyclist. Further, the computing system can determine, based at least in part on the one or more traveled paths of the one or more objects, when the object of the one or more objects that is at least partly occluded was previously detected. For example, the traveled path of the cyclist (e.g., the path that the cyclist traveled from two seconds ago to the current time) can be used to determine that the cyclist occluded by the passing truck is the same cyclist that was detected two seconds ago.

The systems, methods, devices, and tangible non-transitory computer-readable media in the disclosed technology can provide a variety of technical effects and benefits to the overall operation of various computing systems and/or devices including improving the performance of a device or system (e.g., a vehicle, computing device, or robotic system) and the effectiveness of detection, tracking, and motion prediction of objects proximate to a computing system or device (e.g., objects proximate to a vehicle or robotic system). The disclosed technology can also more effectively determine the properties and/or attributes of objects through use of a machine-learned model that facilitates rapid and accurate detection and/or recognition of objects. Further, use of a machine-learned model to detect, track, and predict the path of objects allows for more effective performance in comparison to other approaches including rules-based determination systems.

For example, the disclosed technology can provide more effective object detection, tracking, and motion prediction by performing the detection, tracking, and motion in one stage (e.g., at the same time or in parallel). In this way, the disclosed technology can reduce false negatives and other errors in detection, tracking, and prediction by using accumulated sensor data from past time periods to better detect, track, and/or predict the motion of objects at a current time period. Further, the performing detection, tracking, and prediction in a simultaneous or near-simultaneous way can reduce the accumulation of errors that is more likely to be prevalent in a cascade approach in which detection, tracking, and prediction are performed sequentially.

Example systems in accordance with the disclosed technology can achieve significantly improved average orientation error and a reduction in the number of detection outliers (e.g., the number of times in which the difference between predicted class and actual class exceeds a class threshold value), tracking outliers (e.g., the number of times in which the difference between predicted location and actual location exceeds a location threshold value), and/or predicted path outliers (e.g., the number of times in which the difference between predicted path and actual path is greater than a path threshold value). Furthermore, the machine-learned model can be more readily adjusted (e.g., via retraining on a new and/or modified set of training data) than a rules-based system (e.g., via burdensome, manual re-writing of a set of rules) as the computing system can be periodically updated to be able to better calculate the nuances of object properties and/or attributes (e.g., physical dimensions, range of velocities, and/or range of accelerations). This can allow for more efficient modification of the computing system and a reduction in vehicle downtime of vehicles associated with the computing system.

The systems, methods, devices, and tangible non-transitory computer-readable media in the disclosed technology have an additional technical effect and benefit of improved scalability by using a machine-learned model to determine object properties and/or attributes including position, shape, and/or orientation. In particular, modeling object properties and/or attributes through machine-learned models can greatly reduce the research time needed relative to development of hand-crafted object position, shape, and/or orientation determination rules.

For example, for manually created (e.g., rules conceived and written by one or more people) object detection rules, a rule designer may need to derive heuristic models of how different objects may exhibit different properties and/or attributes in different scenarios. Further, it can be difficult to manually create rules that effectively address all possible scenarios that a device including a vehicle (e.g., an autonomous vehicle) may encounter relative to vehicles and other detected objects. By contrast, the disclosed technology, through use of machine-learned models, can train a model on training data, which can be done at a scale proportional to the available resources of the training system (e.g., a massive scale of training data can be used to train the machine-learned model). Further, the machine-learned models can easily be revised as new training data is made available. As such, use of a machine-learned model trained on labeled sensor data can provide a scalable and customizable solution.

As such, the superior determinations of object properties and/or attributes (e.g., positions, shapes, and/or orientations) permit improved safety for passengers of the vehicle and to pedestrians and other vehicles. Further, the disclosed technology can achieve improved fuel economy by requiring fewer course corrections and other energy wasting maneuvers caused by inaccurate or imprecise object detection, tracking, and motion prediction. Additionally, the disclosed technology can result in more efficient utilization of computational resources due to the improvements in processing sensor outputs that come from implementing the disclosed segmentation and proposal region techniques.

The disclosed technology can also improve the operational performance and safety of the vehicle by reducing the amount of wear and tear on vehicle components through more gradual adjustments in the vehicle's travel path that can be performed based on the improved object detection, tracking, and motion prediction by the computing system. For example, more effective object detection, tracking, and motion prediction by the computing system can allow for less jarring vehicle guidance that reduces the amount of strain on the vehicle's engine, braking, and/or steering systems, thereby improving vehicle performance and safety.

Accordingly, the disclosed technology provides more accurate detection, tracking, and motion prediction of objects detected by sensors (e.g., sensors of a vehicle). Operational benefits of the disclosed technology enhanced vehicle safety through improved object detection, tracking, and prediction and a reduction in wear and tear on vehicle components through smoother vehicle navigation based on more effective object detection, tracking, and prediction.

With reference now to FIGS. 1-12, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The operations computing system 104 can include multiple components for performing various operations and functions. Further, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of a vehicle including receiving sensor data from sensors of a vehicle (e.g., the vehicle 108) or one or more remote computing devices (e.g., the one or more remote computing devices 106); generating an input representation of one or more objects based on the sensor data; determining (e.g., determining based on a machine-learned model and/or the input representation) one or more object classes, locations of the one or more objects, and predicted paths of the one or more objects; and/or generating output data (e.g., output data including one or more bounding shapes associated with the one or more objects) based on the input representation.

For example, the operations computing system 104 can be configured to monitor and communicate with the vehicle 108 and/or its users to coordinate a vehicle service provided by the vehicle 108. To do so, the operations computing system 104 can manage a database that includes data including vehicle status data associated with the status of vehicles including the vehicle 108. The vehicle status data can include a location of a vehicle (e.g., a latitude and longitude of a vehicle), the availability of a vehicle (e.g., whether a vehicle is available to pick-up or drop-off passengers and/or cargo), or the state of objects external to a vehicle (e.g., the physical dimensions and/or appearance of objects external to the vehicle).

The operations computing system 104 can communicate with the one or more remote computing devices 106 and/or the vehicle 108 via one or more communications networks including the communications network 102. The communications network 102 can exchange (send and/or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies).

For example, the communications network 102 can include a local area network (e.g. intranet), wide area network (e.g. Internet), wireless Local area network (LAN) network (e.g., via Wi-Fi), cellular network, a SATCOM network, Very high frequency (VHF) network, a high frequency (HF) network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 108 including exchanging (e.g., sending and/or receiving) data or signals with the vehicle 108, monitoring the state of the vehicle 108, and/or controlling the vehicle 108. The one or more remote computing devices 106 can communicate (e.g., exchange data and/or signals) with one or more devices including the operations computing system 104 and/or the vehicle 108 via the communications network 102. For example, the one or more remote computing devices 106 can request the location of the vehicle 108 via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, acceleration, a trajectory, and/or a path of the vehicle 108 based in part on signals or data exchanged with the vehicle 108. In some implementations, the operations computing system 104 can include the one or more remote computing devices 106.

The vehicle 108 can be a ground-based vehicle (e.g., an automobile, a motorcycle, a truck, and/or a bus), an aircraft (e.g., an airplane and/or helicopter), a water craft (e.g., a boat, catamaran, submersible, and/or submarine), amphibious vehicle (e.g., hovercraft), and/or another type of vehicle. The vehicle 108 can be an autonomous vehicle that can perform various actions including driving, navigating, and/or operating, with minimal and/or no interaction from a human driver. The autonomous vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can operate (e.g., drive and/or navigate the vehicle 108) with no interaction from a human driver including a human driver present in the vehicle 108 or a human driver remote (e.g., a tele-operator) from the vehicle 108. A semi-autonomous operational mode can be one in which the vehicle 108 can operate with some interaction from a human driver including a human driver present in the vehicle 108 or remote (e.g., a tele-operator) from the vehicle 108. Park and/or sleep modes can be used between operational modes while the vehicle 108 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., physical dimensions, velocity, acceleration, location, and/or appearance of the one or more objects) can be stored locally in one or more memory devices of the vehicle 108. Furthermore, the vehicle 108 can provide data indicative of the state of the one or more objects (e.g., physical dimensions, velocity, acceleration, location, and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the computing system 112. The computing system 112 can include one or more computing devices located onboard the vehicle 108. For example, the one or more computing devices of the computing system 112 can be located on and/or within the vehicle 108. The one or more computing devices of the computing system 112 can include various components for performing various operations and functions. For instance, the one or more computing devices of the computing system 112 can include one or more processors and one or more tangible non-transitory computer-readable media (e.g., memory devices).

The one or more tangible non-transitory computer-readable media can store instructions that when executed by the one or more processors cause the vehicle 108 (e.g., its computing system, one or more processors, and/or other devices in the vehicle 108) to perform operations and functions, including those operations described herein (e.g., for object detection, tracking, motion prediction, etc.). Further, the computing system 112 can exchange (e.g., send and/or receive) one or more signals and/or data with one or more vehicle systems, vehicle components, and/or remote computing devices. The one or more signals and/or data exchanged by the computing system 112 can be used to determine the state of the vehicle 108, the environment external to the vehicle 108, and/or the state of one or more passengers of the vehicle 108.

As depicted in FIG. 1, the computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of the one or more sensors 114). The one or more sensors 114 can include a LIDAR system, a Radio Detection and Ranging (RADAR) system, one or more cameras (e.g., visible spectrum cameras and/or infrared cameras), one or more thermal sensors, one or more motion sensors, one or more sound sensors (e.g., one or more microphones), one or more tactile sensors, one or more capacitive sensors, and/or other types of imaging capture devices and/or sensors. The sensor data 116 can include image data, radar data, LIDAR data, and/or other data acquired by the one or more sensors 114.

The one or more objects (e.g., the one or more objects detected by the one or more sensors 114) can include, for example, buildings, roads, road markings, road signs, traffic lights, foliage, pedestrians, vehicles, cyclists, and/or other objects. The one or more objects can be located on various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, sensor data 116 can be indicative of one or more LIDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity (e.g., the class) and location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the computing system 112 in processing, analyzing, and perceiving its surrounding environment and its relationship thereto.

The computing system 112 can include a positioning system 118. The positioning system 118 can determine a current position of the vehicle 108. The positioning system 118 can include any device and/or circuitry for analyzing the position of the vehicle 108. For example, the positioning system 118 can determine position (e.g., the position of the vehicle 108) by using one or more inertial sensors, a satellite positioning system, based on IP/MAC address, by using triangulation and/or proximity to network access points or other network components (e.g., cellular towers and/or Wi-Fi access points), and/or other suitable techniques.

The position of the vehicle 108 can be used by various systems of the computing system 112 and/or provided to one or more remote computing devices (e.g., the operations computing system 104 and/or the remote computing device 106). For example, the map data 122 can provide the vehicle 108 with relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that interact and/or cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class, building class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) of an object can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., driving past an object) without increasing the potential risk to the vehicle 108 and/or violating any traffic laws (e.g., speed limits, lane boundaries, movement restrictions indicated by signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees ("X" representing a number of degrees) and/or applying a certain magnitude of braking force. The mobility controller can send one or more control signals to the responsible vehicle control component (e.g., braking control system, steering control system and/or acceleration control system) to execute the instructions and implement the motion plan data 134.

The computing system 112 can include a communications system 136 configured to allow the computing system 112 (and its one or more computing devices) to communicate with other computing devices. The computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the vehicle 108 to communicate with and/or provide and/or receive data and/or signals from a remote computing device 106 associated with a user and/or an item (e.g., an item to be picked-up for a courier service).

The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The computing system 112 can include the one or more human-machine interfaces 140. For example, the computing system 112 can include one or more display devices located on the computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat).

Furthermore, the computing system 112 can perform one or more operations to use and/or control a variety of devices (e.g., vehicles) or systems (e.g., computing systems) including one or more mechanical devices or systems; one or more electromechanical devices or systems; and/or one or more electronic devices or systems. For example, the computing system 112 can use and/or control systems including one or more robotic systems, one or more assembly line systems, and/or one or more remote computing systems. Further, the computing system 112 can use and/or control one or more machine-learned models (e.g., the one or more machine-learned models 1230 and/or the one or more machine-learned models 170 depicted in FIG. 12) to perform one or more operations associated with detecting, tracking, and predicting the motion of one or more objects (e.g., one or more objects proximate to a vehicle, robotic system, and/or the computing system 112).

Figure 2:
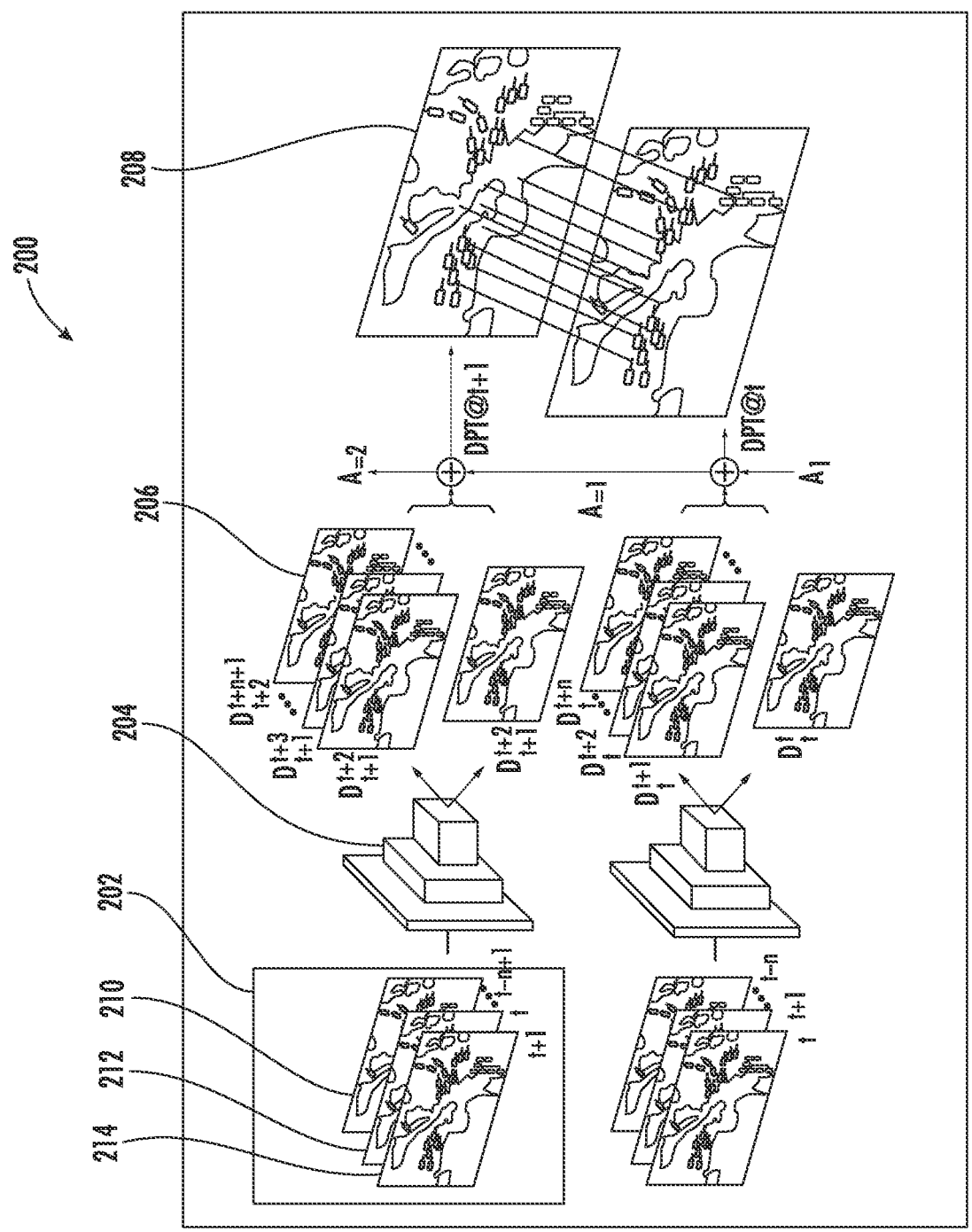
FIG. 2 depicts an example of determining bounding shapes according to example embodiments of the present disclosure.

FIG. 2 depicts an example of determining bounding shapes according to example embodiments of the present disclosure. One or more actions and/or events depicted in FIG. 2 can be implemented by one or more devices (e.g., one or more computing devices) or systems (e.g., one or more computing systems, one or more robotic systems, and/or one or more vehicle systems) including, for example, the operations computing system 104, the vehicle 108, and/or the computing system 112, shown in FIG. 1.

As illustrated, FIG. 2 shows an example model 200 for object detection, tracking, and prediction that includes a tensor 202 (e.g., a four dimensional tensor), a neural network 204 (e.g., a convolutional neural network), one or more predicted bounding shapes 206 (e.g., one or more predicted bounding shapes for one or more detected objects), one or more identified bounding shapes 208 (e.g., one or more bounding shapes in which the one or more bounding shapes are associated with a respective object), a first time interval 210 (e.g., a time interval in the past), a second time interval 212 (e.g., a current time interval), and a third time interval 214 (e.g., a time interval in the future).

The tensor 202 can include one or more spatial dimensions (e.g., spatial dimensions corresponding to the dimensions of a three-dimensional space) and a temporal dimension (e.g., a temporal dimension associated with one or more time intervals). For example, the one or more time intervals (e.g., time frames) can correspond to a sequence of successive time intervals. The neural network 204 can include a convolutional neural network that can receive an input (e.g., data including an input representation of an environment that includes one or more objects). The one or more predicted bounding shapes 206 can represent bounding shapes for objects detected in an environment, which can include bounding boxes for one or more objects over one or more time intervals including the first time interval 210, the second time interval 212, and/or the third time interval 214. The one or more identified bounding shapes 208 can represent the one or more objects that are the same over the one or more time intervals including the first time interval 210, the second time interval 212, and/or the third time interval 214.

For example, if the second time interval 212 (e.g., a time interval t) and the third time interval 214 (e.g., a time interval t+1 that is one second after the time interval t) are respectively associated with an area that includes the same three objects (e.g., a row of vehicles including a vehicle "a" followed by vehicle "b" which is followed by a vehicle "c"), there would be six predicted bounding shapes over the two time intervals (e.g., three predicted bounding shapes in each of the second time interval 212 and the third time interval 214). In some implementations, the computing system 112 can determine that the objects associated with the one or more predicted bounding shapes 206 in the second time interval 212 and the third time interval 214 that have overlapping boundary shapes are the same object. The bounding shapes determined (e.g., determined by the computing system 112) to be the same object over time can result in the one or more identified bounding shapes 208.

Figure 3:
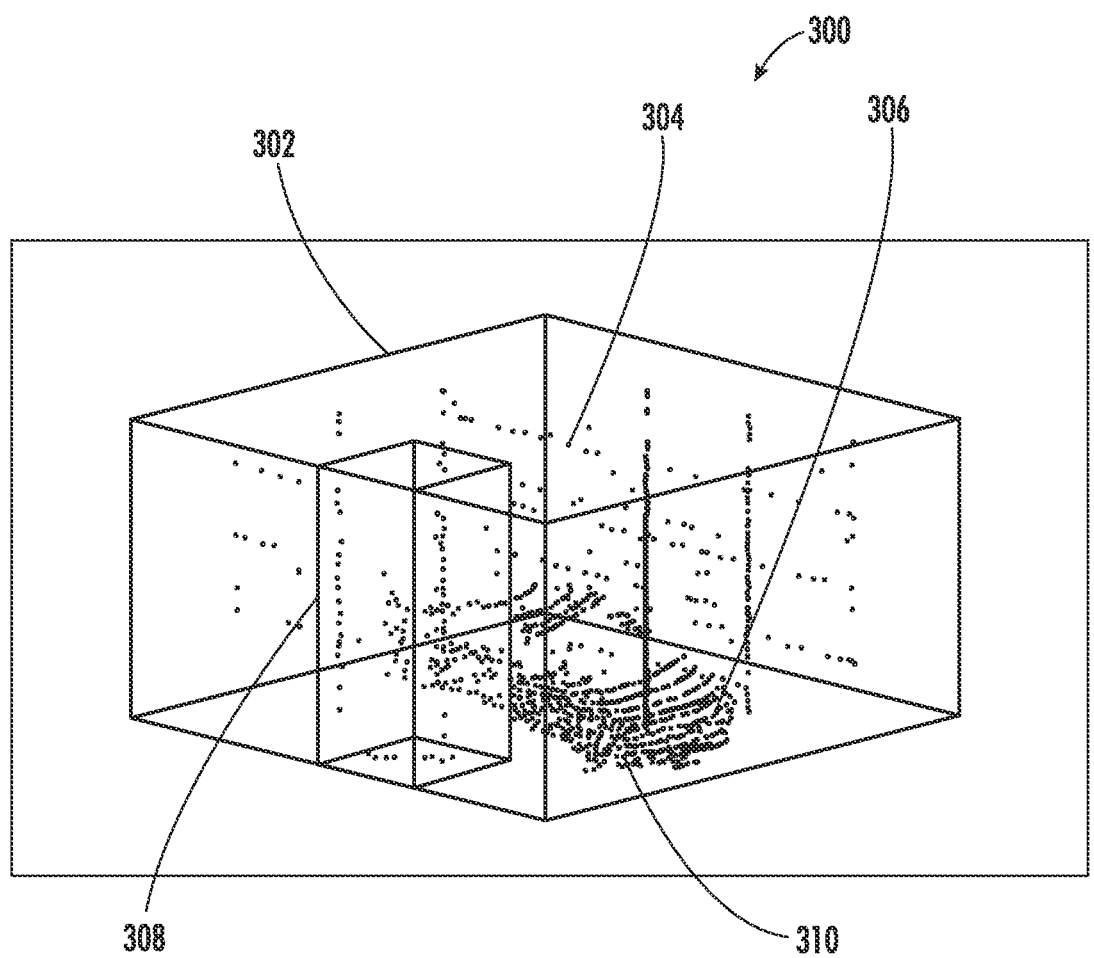
FIG. 3 depicts an example of data parameterization according to example embodiments of the present disclosure.

FIG. 3 depicts an example of data parameterization according to example embodiments of the present disclosure. One or more actions and/or events depicted in FIG. 3 can be implemented by one or more devices (e.g., one or more computing devices) or systems (e.g., one or more computing systems, one or more robotic systems, and/or one or more vehicle systems) including, for example, the operations computing system 104, the vehicle 108, or the computing system 112, shown in FIG. 1.

As illustrated, FIG. 3 shows an example 300 of data parameterization that includes an environment 302 (e.g., a representation of a physical environment), a first voxel 304 (e.g., a voxel corresponding to a portion of an environment that is not occupied by an object), a second voxel 306 (e.g., a voxel corresponding to a portion of an environment occupied by an object), an input feature 308 (e.g., a height input feature that can be used as an input to a neural network including a convolutional neural network), and a third voxel 310 (e.g., a voxel corresponding to a portion of an environment occupied by an object).

In this example, a computing system (e.g., the computing system 112, the computing system 1210, and/or the machine-learning computing system 1250) can receive data (e.g., sensor data) that is based on the detection of an environment including one or more objects (e.g., LIDAR point cloud data). The computing system can generate a representation (e.g., an input representation for a neural network) of the environment including the one or more objects, based on the sensor data. The representation can use various data structures including voxels and/or pixels. For example, each of the voxels in the environment 302 can be assigned a value (e.g., a binary value) based on whether the voxel is occupied by an object (e.g., an object that is not determined to be a background object that is not of significance to a machine-learned classifier). The data received from a sensor (e.g., a LIDAR sensor) can be sparse (e.g., much of the space in the environment is occupied by background including non-solid objects like empty air space).

The computing system can determine that portions of the environment 302 (e.g., the second voxel 306 and the third voxel 310) that corresponds to a foreground object (e.g., an object that is of significance to a machine-learned classifier) can be assigned a value (e.g., the value 1 to denote occupied space). Further, the computing system can determine that portions of the environment 302 (e.g., the first voxel 304) that correspond to a background object (e.g., an object that is not of significance to a machine-learned classifier) can be assigned a different value (e.g., the value 0 to denote space that is not occupied) from the value assigned to the foreground objects.

Furthermore, in some embodiments, two-dimensional convolutions can be performed on the x and y dimensions of the environment (e.g., the width and depth dimensions) and the z dimension (e.g., the height dimension) can be treated as a channel dimension. In this way, the disclosed technology can perform more optimally by using the voxel representation of an environment as an input representation for a neural network (e.g., a convolutional neural network).

Figure 4:
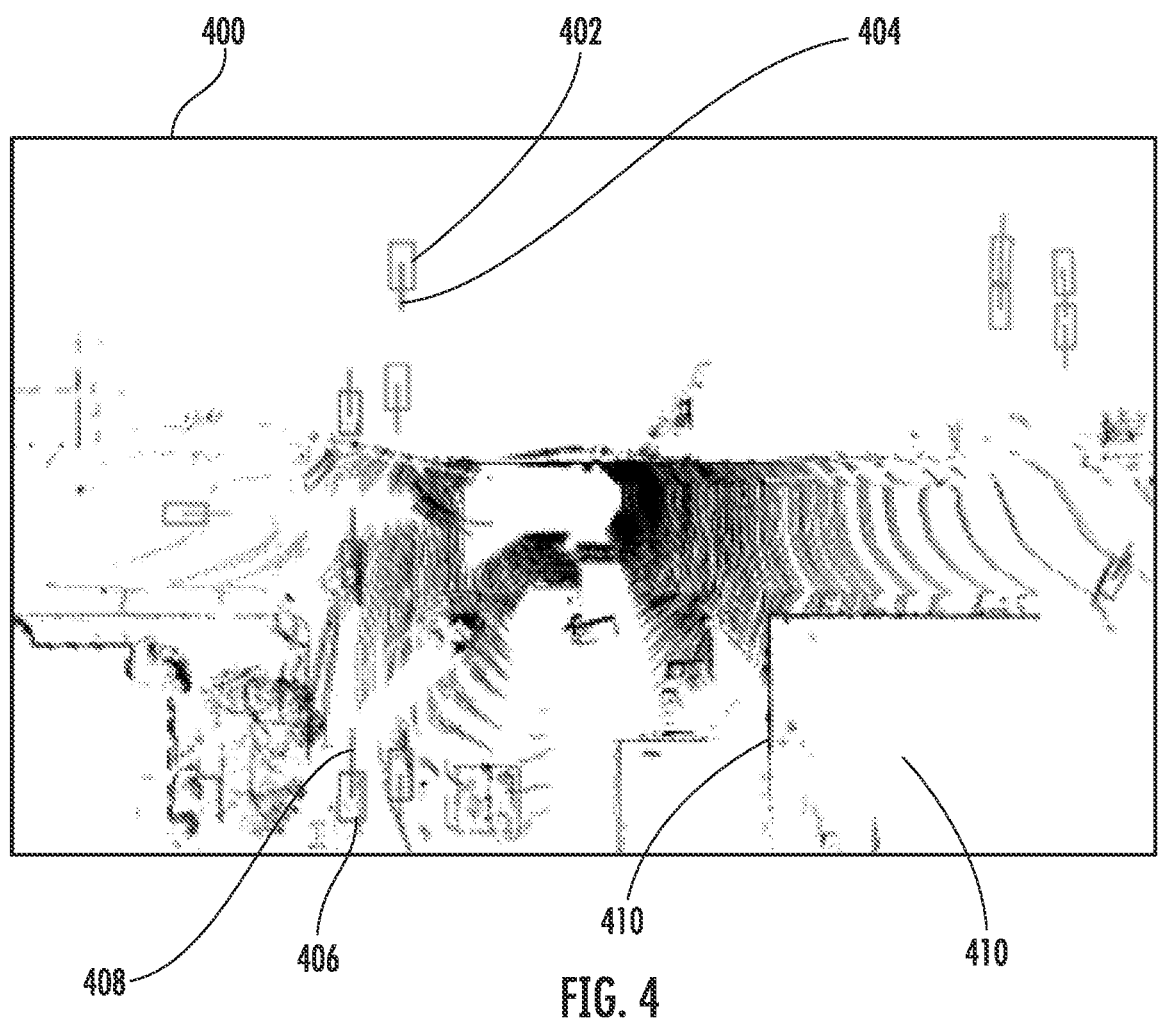
FIG. 4 depicts an example of temporal and motion prediction of objects in an environment according to example embodiments of the present disclosure.

FIG. 4 depicts an example of temporal and motion prediction of objects in an environment according to example embodiments of the present disclosure. One or more actions and/or events depicted in FIG. 4 can be implemented by one or more devices (e.g., one or more computing devices) or systems (e.g., one or more computing systems, one or more robotic systems, and/or one or more vehicle systems) including, for example, the operations computing system 104, the vehicle 108, or the computing system 112, shown in FIG. 1.

As illustrated, FIG. 4 shows an environment 400 (e.g., an environment that includes one or more objects) that includes a first bounding shape 402 (e.g., a bounding shape around a detected object), a first object orientation 404 (e.g., a direction of travel for the object inside the bounding shape 402), a second bounding shape 406 (e.g., a bounding shape around a detected object), a second object orientation 408 (e.g., an orientation or heading for the object inside the bounding shape 406), a first area 410 (e.g., a detected edge of a background area), and a second area 412 (e.g., a detected background area).

In this example, the environment 400 represents an urban environment that includes multiple vehicles detected by one or more sensors associated with a computing system (e.g., the computing system 112). The computing system (e.g., the computing system 112, the computing system 1210, and/or the machine-learning computing system 1250) can generate bounding shapes (e.g., the first bounding shape 402 and the second bounding shape 406) around detected objects. Further, based on the detection of the objects in the environment 400 over multiple time intervals, the computing system can determine an orientation (e.g., a direction of travel) for the bounding shapes (e.g., the orientation 404 for the bounding shape 402, and the orientation 408 for the bounding shape 406).

Furthermore, the computing system can determine the areas of the environment 400 that are foreground (e.g., areas of the environment 400 that are of significance to a machine-learned classifier and that include objects that change location or position over time) and the areas of the environment 400 that are background (e.g., areas of the environment 400 that are not of significance to a machine-learned classifier and that include objects that do not change location or position over time). For example, the computing system can determine that the second area 412 is a background area (e.g., an abandoned parking lot) that is separated from other areas of the environment 400 by the first area 410 (e.g., a wall that runs along the edge of the abandoned parking lot).

Figure 5:
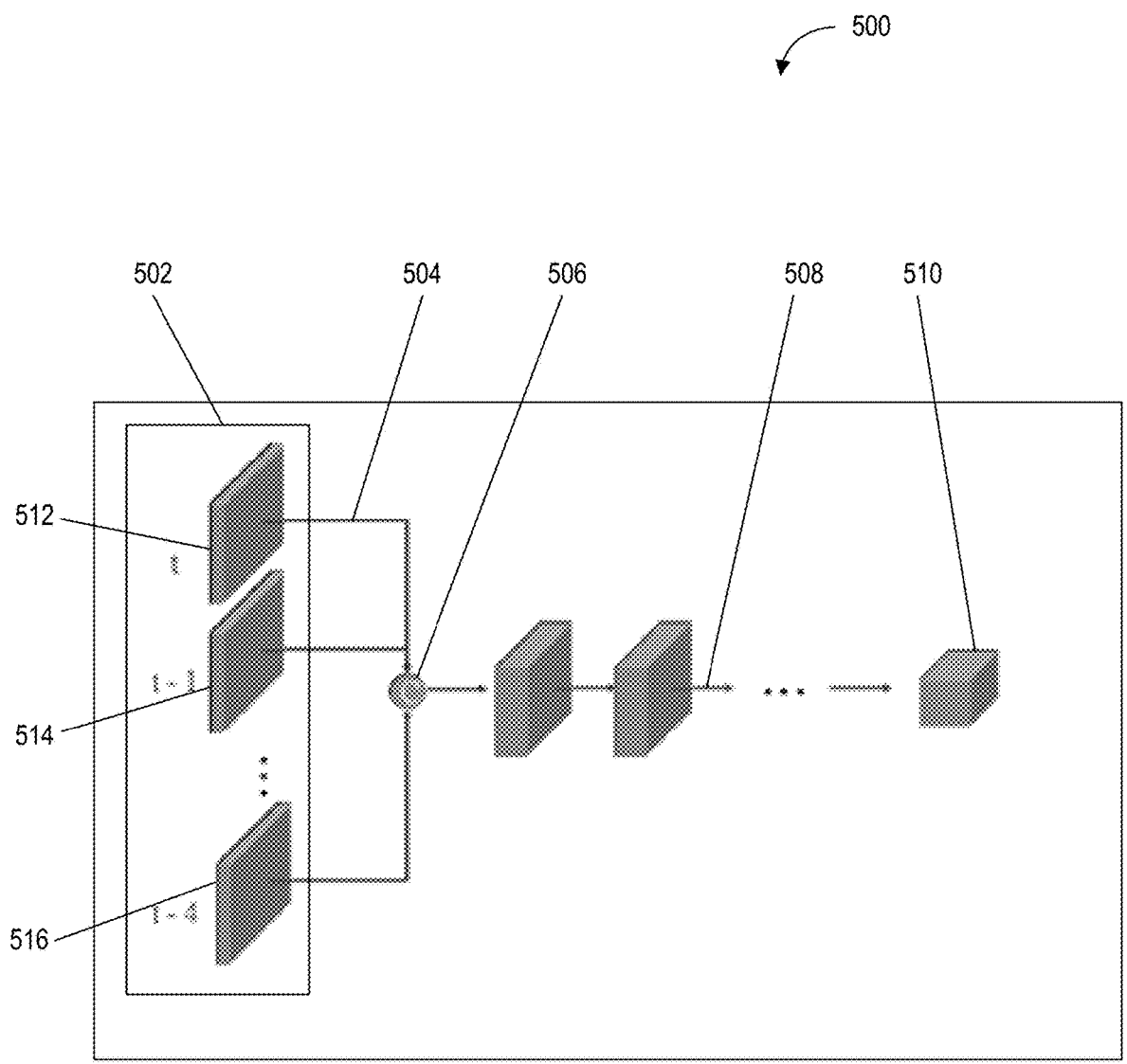
FIG. 5 depicts an example of early fusion of temporal information of a machine-learned model according to example embodiments of the present disclosure.

FIG. 5 depicts an example of early fusion of temporal information of a machine-learned model according to example embodiments of the present disclosure. One or more actions and/or events depicted in FIG. 5 can be implemented by one or more devices (e.g., one or more computing devices) or systems (e.g., one or more computing systems, one or more robotic systems, and/or one or more vehicle systems) including, for example, the operations computing system 104, the vehicle 108, or the computing system 112, shown in FIG. 1.

As illustrated, FIG. 5 shows an example model 500 for object detection, tracking, and prediction in which temporal information is aggregated at an early layer (e.g., a first layer) of a neural network (e.g., a convolutional neural network). The example model 500 (e.g., a machine-learned model that includes a plurality of layers) includes a tensor 502 (e.g., a four-dimensional tensor), a convolution 504 (e.g., a two-dimensional convolution which can include padding), a convolution 506 (e.g., a one dimensional convolution), a convolution 508 (e.g., a two-dimensional convolution which can include padding), a tensor 510 (e.g., a three-dimensional tensor), a time interval 512 (e.g., a current time), a time interval 514 (e.g., a time one second before the current time), and a time interval 516 (e.g., a time four seconds before the current time).

In this example, temporal information (e.g., temporal information associated with one or more time intervals) can be aggregated (e.g., combined) at a first layer of a neural network (e.g., a convolutional neural network). Multiple time intervals (e.g., a first time interval 512, a second time interval 514, and a third time interval 516) can then be used to generate an input representation that includes the combined multiple time intervals, which can share weights among feature maps (e.g., group convolution). Accordingly, using an early fusion approach, detection of objects can occur rapidly, as if the detection was performed by a single time interval (e.g., time frame) detector.

Figure 6:
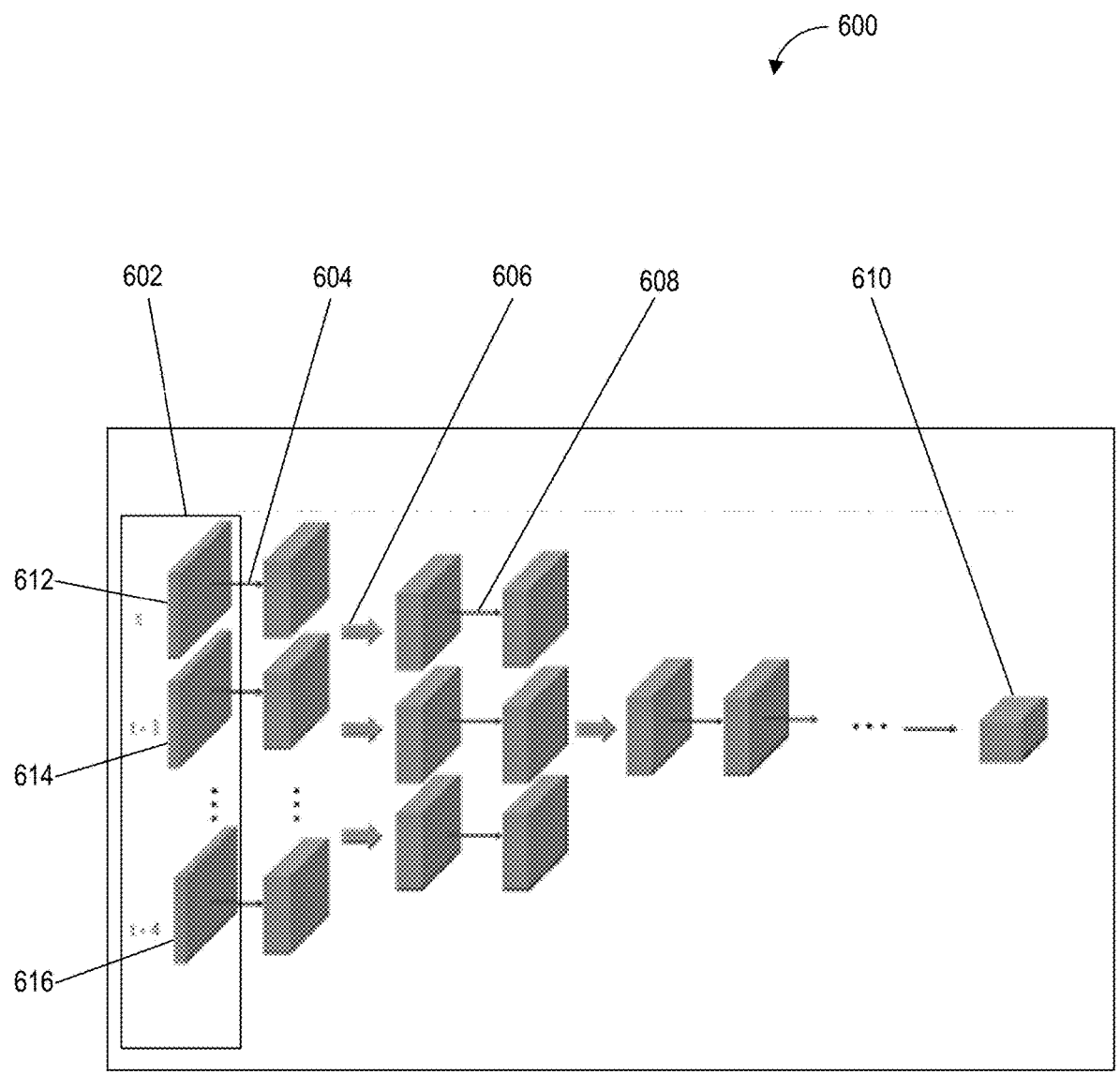
FIG. 6 depicts an example of late fusion of temporal information of a machine-learned model according to example embodiments of the present disclosure.

FIG. 6 depicts an example of late fusion of temporal information of a machine-learned model according to example embodiments of the present disclosure. One or more actions and/or events depicted in FIG. 6 can be implemented by one or more devices (e.g., one or more computing devices) or systems (e.g., one or more computing systems, one or more robotic systems, and/or one or more vehicle systems) including, for example, the operations computing system 104, the vehicle 108, or the computing system 112, shown in FIG. 1.

As illustrated, FIG. 6 shows an example model 600 for object detection, tracking, and prediction in which temporal information is gradually aggregated over several layers (e.g., multiple layers including a first layer) of a neural network (e.g., a convolutional neural network). The example model 600 (e.g., a machine-learned model that includes a plurality of layers) includes a tensor 602 (e.g., a four-dimensional tensor), a first convolution 604 (e.g., a two-dimensional convolution which can include padding), a second convolution 606 (e.g., a three-dimensional convolution), a third convolution 608 (e.g., a two-dimensional convolution which can include padding), a tensor 610 (e.g., a three-dimensional tensor), a first time interval 612 (e.g., a current time), a second time interval 614 (e.g., a time one second before the first time interval), and a third time interval 616 (e.g., a time four seconds before the first time interval).

In this example, temporal information (e.g., temporal information associated with one or more time intervals) can be aggregated (e.g., combined) over multiple layers of a neural network (e.g., a convolutional neural network). In some embodiments, different branches of different convolutional layers can be used to perform operations including binary classification (e.g., classifying an object as being a member of a particular class or not being a member of that particular class) to determine the probability of an object belonging to a particular class; and predicting a bounding shape over a current time interval and one or more time intervals into the future. Accordingly, using a late fusion approach and leveraging the benefits of merging temporal information of input representations over multiple time intervals, more effective motion prediction can be performed and can be used to estimate features including the velocity and/or acceleration of objects over the multiple time intervals.

Figure 7:
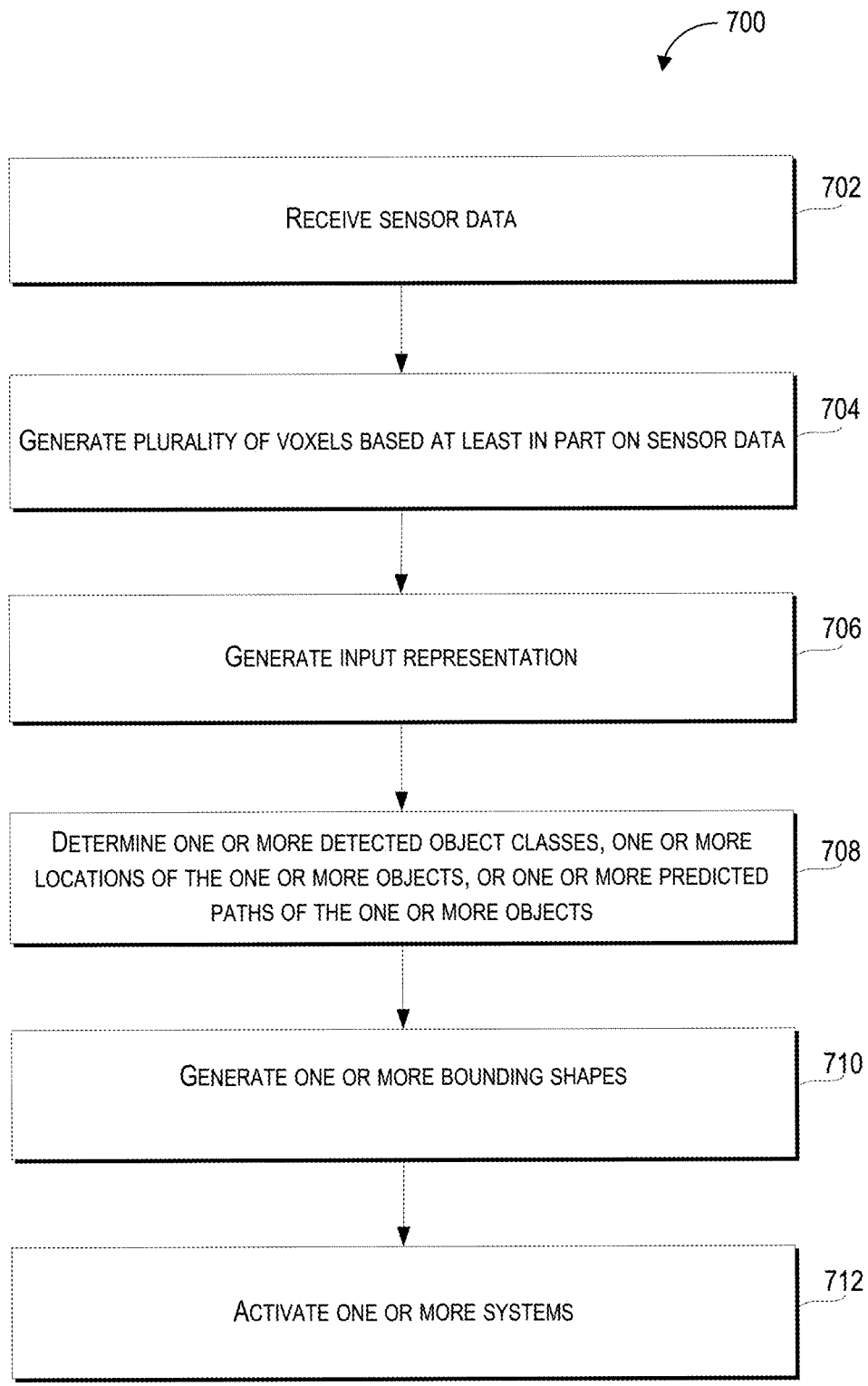
FIG. 7 depicts a flow diagram of an example method of object detection, tracking, and prediction according to example embodiments of the present disclosure.

FIG. 7 depicts a flow diagram of an example method of object detection, tracking, and prediction according to example embodiments of the present disclosure. One or more portions of a method 700 can be implemented by one or more devices (e.g., one or more computing devices) or systems (e.g., one or more computing systems, one or more robotic systems, and/or one or more vehicle systems) including, for example, the operations computing system 104, the vehicle 108, or the computing system 112, shown in FIG. 1. Moreover, one or more portions of the method 700 can be implemented as an algorithm on the hardware components of the devices described herein (e.g., as in FIG. 1) to, for example, detect, track, and/or predict one or more motion paths for one or more objects. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 702, the method 700 can include receiving sensor data. The sensor data can include information based at least in part on one or more sensor outputs associated with detection of an environment over one or more time intervals by one or more sensors (e.g., one or more sensors of a computing system, a manually operated vehicle, an autonomous vehicle, and/or one or more robotic systems). The one or more sensors can include one or more LIDAR devices, one or more image sensors (e.g., one or more cameras), one or more radar devices, one or more sonar devices, and/or one or more thermal sensors. The environment detected by the one or more sensors can include one or more objects. The one or more objects detected by the one or more sensors can include, one or more vehicles (e.g., one or more automobiles, trucks, trains, and/or buses), one or more pedestrians, one or more cyclists, one or more roads, one or more road markings, one or more road signs, one or more buildings, one or more bodies of water, cargo, one or more walls, one or more pieces of furniture, and/or one or more natural geographic formations. Further, the sensor data can be based at least in part on one or more sensor outputs associated with one or more physical properties and/or attributes of the one or more objects.

The one or more sensor outputs can be associated with the shape, sound, color, location, position, orientation (e.g., heading), texture, velocity, acceleration, and/or physical dimensions (e.g., width, depth, and/or height) of the one or more objects and/or portions of the one or more objects (e.g., a front portion of the one or more objects that is facing the vehicle). By way of example, the computing system 112 can wirelessly receive the sensor data (e.g., sensor data including physical dimensions, velocity, and/or acceleration of one or more objects) from one or more sensors of the vehicle 108.

In some embodiments, the one or more sensor outputs can include one or more three-dimensional points corresponding to a plurality of surfaces of the one or more objects detected by the one or more sensors. The one or more three-dimensional points associated with one or more surfaces (e.g., outermost or exterior portion) of the one or more objects detected by the one or more sensors can include one or more x, y, and z coordinates (e.g., x, y, and z coordinates corresponding to a width, depth, and height respectively). For example, the computing system 112 can receive one or more sensor outputs from one or more sensors including one or more LIDAR devices that detect the surfaces of objects (e.g., buildings, other vehicles, cyclists, and/or pedestrians) proximate to the vehicle and generate one or more sensor outputs including a plurality of three-dimensional points corresponding to the surfaces of the detected objects.

In some embodiments, the sensor data can be associated with a bird's eye view vantage point. For example, one or more sensors of the vehicle 108 can be positioned on a portion of the vehicle 108 that provides the one or more sensors with a bird's eye perspective (e.g., an elevated or top-down perspective) on one or more objects in the environment around the vehicle 108.

At 704, the method 700 can include generating, based at least in part on the sensor data, a plurality of voxels corresponding to the environment including the one or more objects. In some embodiments, a height dimension of the plurality of voxels can be used as an input channel of the input representation. For example, the computing system 112 can generate the plurality of voxels based at least in part on the sensor data received from the one or more sensors of the vehicle 108. By way of further example, the computing system 112 can quantize the sensor data into a plurality of voxels which can be stored in a data structure that can be used as an input representation for a neural network.

In some embodiments, the plurality of voxels (e.g., the plurality of voxels generated in 704) corresponding to one or more portions of the environment occupied by the one or more objects can be used to generate an input representation for a machine-learned model.

At 706, the method 700 can include generating, based at least in part on the sensor data, an input representation of the one or more objects. The input representation can include a temporal dimension and one or more spatial dimensions. For example, the computing system 112 can generate an input representation including a LIDAR based input, based at least in part on the sensor data. Further, the input representation can include and/or be associated with one or more data structures that can be used to represent one or more detected objects. The input representation can include voxels, pixels, and/or any other way of representing an object in an environment. The input representation can include a temporal dimension (e.g., a dimension associated with one or more time intervals) and/or one or more spatial dimensions (e.g., one or more dimensions associated with one or more physical dimensions corresponding to objects in a physical environment).

In some embodiments, the input representation can include a tensor associated with a set of dimensions including the temporal dimension and/or the one or more spatial dimensions. The temporal dimension of the tensor can be associated with the one or more time intervals. Further, the one or more spatial dimensions of the tensor can include a width dimension, a depth dimension, and/or a height dimension that can be used as an input channel for the machine-learned model.

In some embodiments, the input representation (e.g., an input representation for a machine-learned model) can be based at least in part on the plurality of voxels (e.g., the plurality of voxels generated in 704) corresponding to one or more portions of the environment occupied by the one or more objects.

At 708, the method 700 can include determining, based at least in part on the input representation and/or a machine-learned model, at least one of one or more detected object classes of the one or more objects (e.g., determining whether an object belongs to a vehicle class, pedestrian class, building class, or road sign class), one or more locations of the one or more objects over the one or more time intervals (e.g., one or more motion paths of the one or more objects over a predetermined period of time), and/or one or more predicted paths of the one or more objects (e.g., a prediction of one or more motion paths that each of the one or more objects will respectively travel in the future). For example, the computing system 112 can determine the object classes (e.g., vehicle class, building class, or pedestrian class), locations (e.g., location relative to the vehicle 108), and predicted paths of the one or more objects based at least in part on the input representation and/or the machine-learned model (e.g., the input representation is provided as input to the machine-learned model which generates an output including the object classes, object locations over time, and/or predicted paths of the objects).

In some embodiments, the machine-learned model can be based at least in part on one or more classification techniques including a convolutional neural network, a feed forward neural network, a recurrent neural network, and/or a radical basis neural network.

At 710, the method 700 can include generating, based at least in part on the input representation and the machine-learned model, output data including one or more bounding shapes corresponding to the one or more objects detected by the one or more sensors. The one or more bounding shapes (e.g., two-dimensional and/or three-dimensional bounding polyhedrons, ellipsoids, bounding polygons, and/or bounding boxes) that partly or completely surround one or more areas, volumes, sections, and/or regions associated with one or more areas of the input representation (e.g., the input representation associated with physical dimensions of the one or more objects in the environment).

For example, the computing system 112 can generate one or more bounding shapes including one or more polygons (e.g., rectangles) that respectively surround a portion or the entirety of each of the one or more objects. For example, the one or more bounding shapes can enclose the one or more objects that are detected by the one or more sensors (e.g., LIDAR devices) of the vehicle 108. By way of further example, the computing system 112 can generate the one or more bounding boxes around detected objects based at least in part on data associated with the input representation and the machine-learned model.

At 712, the method 700 can include activating, based at least in part on the output data, one or more systems which can include one or more mechanical systems, one or more electromechanical systems, and/or one or more electronic systems vehicle systems associated with operation of computing system, a manually operated vehicle, an autonomous vehicle, or one or more robotic systems. For example, the computing system 112 can activate one or more vehicle systems based in part on the one or more predicted paths of the one or more objects. For example, the computing system 112 can activate a braking system of the vehicle 108 based at least in part on output data indicating that an object will intersect the travel path of the vehicle 108.

By way of example, the computing system 112 can activate one or more electromechanical systems including the motors that turn the wheels of a robotic system configured to traverse an area and perform one or more operations (e.g., cutting grass, vacuuming, and/or monitoring an area).

By way of further example, the computing system 112 can activate one or more vehicle systems including one or more communication systems that can exchange one or more signals and/or data with other vehicle systems, vehicle components, other vehicles, or remote computing devices; one or more lighting systems (e.g., one or more headlights, hazard lights, and/or vehicle compartment lights); one or more vehicle safety systems (e.g., one or more collision avoidance systems, one or more safety restraint systems, one or more automatic braking systems); one or more notification systems that can generate one or more notifications for passengers of the vehicle (e.g., auditory and/or visual notifications about the state or predicted state of objects proximal to the vehicle); braking systems (e.g., slowing the vehicle as the vehicle approaches a stop sign); propulsion systems (e.g., changing the amount of power that is output by engines and/or motors of the vehicle) that can be used to change the acceleration and/or velocity of the vehicle; and/or steering systems that can change the path, course, and/or direction of travel of the vehicle (e.g., steering the vehicle 108 around detected obstacles).

Figure 8:
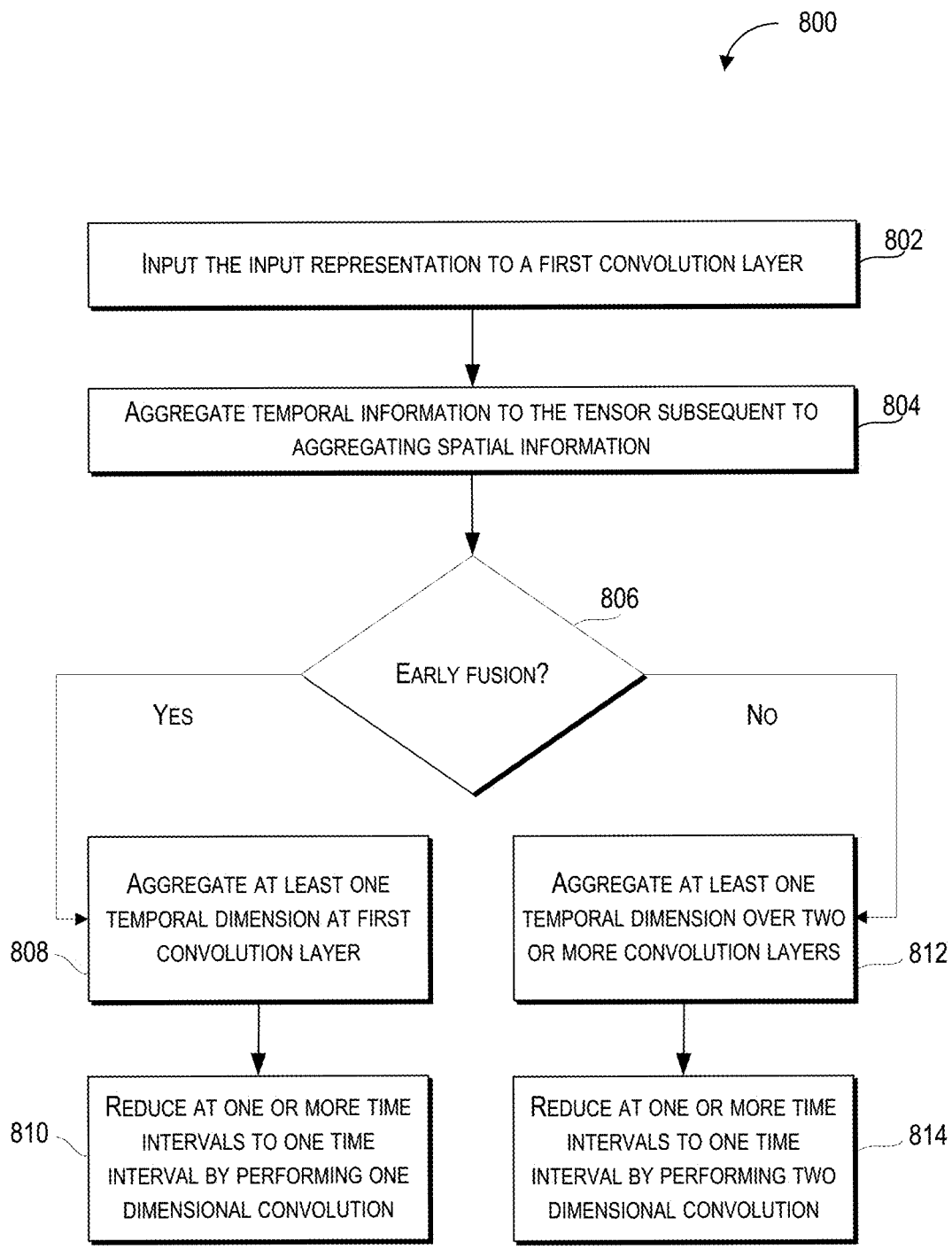
FIG. 8 depicts a flow diagram of an example method of object detection, tracking, and prediction according to example embodiments of the present disclosure.

FIG. 8 depicts a flow diagram of an example method of object detection, tracking, and prediction according to example embodiments of the present disclosure. One or more portions of a method 800 can be implemented by one or more devices (e.g., one or more computing devices) or systems (e.g., one or more computing systems, one or more robotic systems, and/or one or more vehicle systems) including, for example, the operations computing system 104, the vehicle 108, or the computing system 112, shown in FIG. 1. Moreover, one or more portions of the method 800 can be implemented as an algorithm on the hardware components of the devices described herein (e.g., as in FIG. 1) to, for example, detect, track, and/or predict one or more motion paths for one or more objects. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 802, the method 800 can include inputting (e.g., sending and/or providing) the input representation (e.g., the input representation of the method 700) to a first convolution layer of a plurality of convolution layers of the machine-learned model (e.g., the machine-learned model of the method 700). For example, the computing system 112, the computing system 1250, and/or the machine-learning computing system 1270 can send input representation data including the input representation to a first convolutional layer of a machine-learned model. In some embodiments, one or more weights of a plurality of feature maps for each of the plurality of convolution layers can be shared between the plurality of convolution layers.

At 804, the method 800 can include aggregating temporal information (e.g., temporal information associated with the temporal dimension of the method 700) to the tensor (e.g., the tensor of the method 700) subsequent to aggregating spatial information associated with the one or more spatial dimensions to the tensor. For example, the computing system 112, the computing system 1250, and/or the machine-learning computing system 1270 can aggregate (e.g., combine and/or add) temporal data including the temporal information to tensor data including the tensor, after adding spatial data including the spatial information.

In some embodiments, the temporal information can be aggregated as the input representation is processed by the plurality of convolution layers. Furthermore, in some embodiments, the temporal information can be associated with the temporal dimension of the tensor (e.g., temporal data comprising temporal information can be associated with the one or more time intervals of the temporal dimension of the tensor).

At 806, the method 800 can include determining (e.g., determining based at least in part on the sensor data, the input representation, and/or the machine-learned model of the method 700) whether, when, or that, temporal information associated with a temporal dimension of the tensor will be aggregated at a first layer of a machine-learned model (e.g., early fusion) or gradually aggregated over multiple layers of a machine-learned model (e.g., late fusion). For example, the computing system 112, the computing system 1250, and/or the machine-learning computing system 1270 can determine, based at least in part on one or more fusion criteria, whether to aggregate the temporal data including the temporal information at the first layer of the machine-learned model or gradually over multiple layers of the machine-learned model. The one or more fusion criteria can include the detection of a flag (e.g., a flag signaling whether to perform early fusion or late fusion) in input representation data associated with the temporal information.

Responsive to determining that temporal information associated with a temporal dimension of the tensor will be aggregated at a first layer of a machine-learned model (e.g., early fusion), the method 800 can proceed to 808. Responsive to determining that the temporal information associated with the temporal dimension of the tensor will be gradually aggregated over multiple layers of a machine-learned model (e.g., no early fusion or late fusion), the method 800 can proceed to 812.

At 808, the method 800 can include aggregating (e.g., combining and/or adding) the temporal information associated with the temporal dimension at the first convolution layer of the plurality of convolution layers. For example, the computing system 112, the computing system 1250, and/or the machine-learning computing system 1270 can aggregate (e.g., add) temporal data including the temporal information to tensor data including the tensor, at the first convolutional layer of the plurality of convolutional layers of the machine-learned model.

At 810, the method 800 can include reducing the one or more time intervals of the temporal dimension to one time interval by performing a one-dimensional convolution on the temporal information associated with the temporal dimension. For example, the computing system 112, the computing system 1250, and/or the machine-learning computing system 1270 can reduce one or more time interval values associated with temporal dimension data to one time interval value by performing a one-dimensional convolution on the temporal information associated with the temporal dimension data.

At 812, the method 800 can include aggregating the temporal information associated with the temporal dimension of the tensor over two or more convolution layers of the plurality of convolution layers. For example, the computing system 112, the computing system 1250, and/or the machine-learning computing system 1270 can aggregate (e.g., add) temporal data including the temporal information to tensor data including the tensor, over two or more convolutional layers of the plurality of convolutional layers of the machine-learned model.

At 814, the method 800 can include reducing the one or more time intervals of the temporal dimension to one time interval by performing a two-dimensional convolution on the temporal information associated with the temporal dimension. For example, the computing system 112, the computing system 1250, and/or the machine-learning computing system 1270 can reduce one or more time interval values associated with temporal dimension data to one time interval value by performing a two-dimensional convolution on the temporal information associated with the temporal dimension data.

Figure 9:
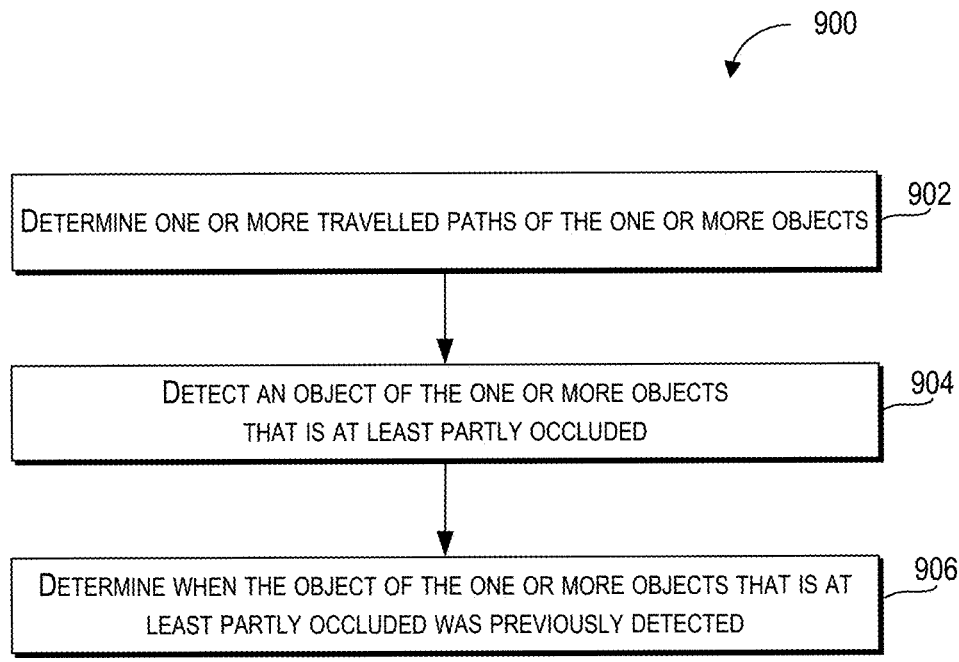
FIG. 9 depicts a flow diagram of an example method of object detection, tracking, and prediction according to example embodiments of the present disclosure.

FIG. 9 depicts a flow diagram of an example method of object detection, tracking, and prediction according to example embodiments of the present disclosure. One or more portions of a method 900 can be implemented by one or more devices (e.g., one or more computing devices) or systems (e.g., one or more computing systems, one or more robotic systems, and/or one or more vehicle systems) including, for example, the operations computing system 104, the vehicle 108, or the computing system 112, shown in FIG. 1. Moreover, one or more portions of the method 900 can be implemented as an algorithm on the hardware components of the devices described herein (e.g., as in FIG. 1) to, for example, detect, track, and/or predict one or more motion paths for one or more objects. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 902, the method 900 can include determining one or more traveled paths of the one or more objects (e.g., the one or more objects of the method 700) based at least in part on one or more locations of the one or more objects over a sequence of the one or more time intervals including a last time interval associated with a current time and the one or more time intervals prior to the current time. For example, the computing system 112 can determine one or more traveled paths of the one or more objects based at least in part on sensor data (e.g., the sensor data of the method 700) including one or more locations of the one or more objects over a sequence of the one or more time intervals including a last time interval associated with a current time and the one or more time intervals prior to the current time.

In some embodiments, the one or more predicted paths of the one or more objects (e.g., the one or more predicted paths of the method 700) can be based at least in part on the one or more traveled paths.

At 904, the method 900 can include detecting an object of the one or more objects that is at least partly occluded (e.g., blocked and/or obstructed from detection by one or more sensors of a vehicle including the vehicle 108). For example, the computing system 112 can detect, based at least in part on the sensor data and/or the input representation (e.g., the sensor data and/or the input representation of the method 700), an object of the one or more objects that is at least partly occluded (e.g., an object blocked by another object). By way of further example, a truck can be partly obstructed by a group of trees that is between the one or more sensors of the vehicle 108 and the truck. Further, an object can be occluded by another object (e.g., mud or dust) that is on (e.g., affixed to, clinging to, or stuck on) a portion of the one or more sensors of the vehicle 108.

At 906, the method 900 can include determining, based at least in part on the one or more traveled paths of the one or more objects, when the object of the one or more objects that is at least partly occluded was previously detected. For example, the computing system 112 can determine, based at least in part on the one or more traveled paths of the one or more objects, when the object of the one or more objects that is at least partly occluded was previously detected (e.g., occluded in a previous time interval of one or more time intervals that have passed). By way of further example, the traveled path of a truck (e.g., the path that the truck traveled between a time interval five seconds ago and the current time) can be used to determine that the truck that is currently occluded by a group of trees is the same truck that was detected five seconds ago.

Figure 10:
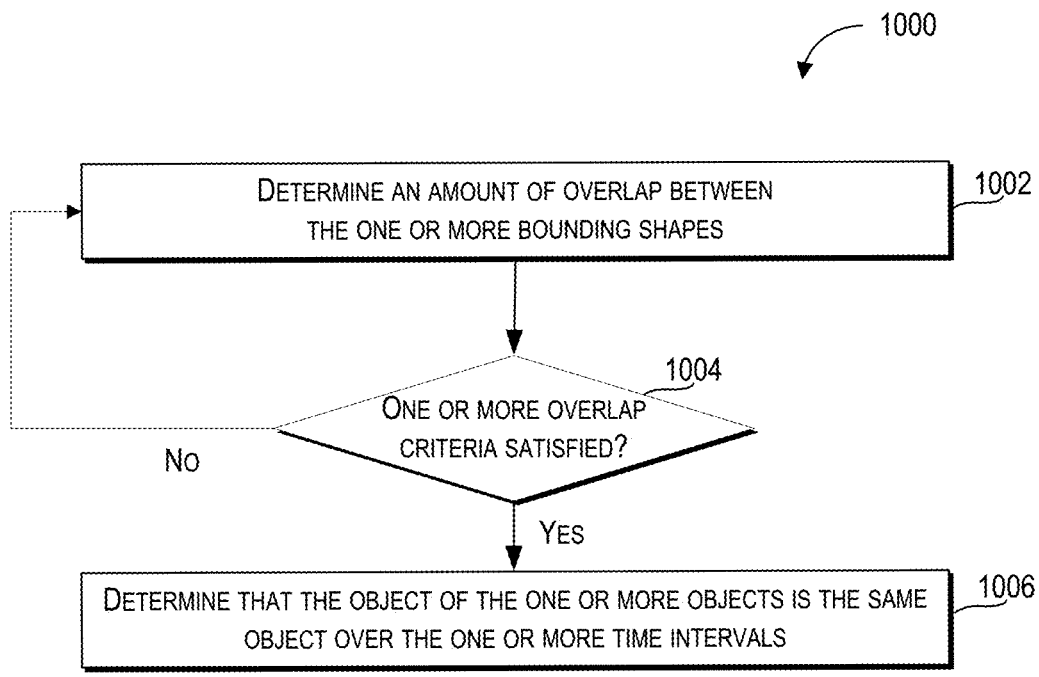
FIG. 10 depicts a flow diagram of an example method of object detection, tracking, and prediction according to example embodiments of the present disclosure.

FIG. 10 depicts a flow diagram of an example method of object detection, tracking, and prediction according to example embodiments of the present disclosure. One or more portions of a method 1000 can be implemented by one or more devices (e.g., one or more computing devices) or systems (e.g., one or more computing systems, one or more robotic systems, and/or one or more vehicle systems) including, for example, the operations computing system 104, the vehicle 108, or the computing system 112, shown in FIG. 1. Moreover, one or more portions of the method 1000 can be implemented as an algorithm on the hardware components of the devices described herein (e.g., as in FIG. 1) to, for example, detect, track, and/or predict one or more motion paths for one or more objects. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1002, the method 1000 can include determining, based at least in part on the input representation (e.g., the input representation of the method 700) and/or the machine-learned model (e.g., the machine-learned model of the method 700), an amount of overlap (e.g., an amount by which two or more bounding shapes overlap and/or intersect over the one or more time intervals) between the one or more bounding shapes (e.g., the one or more bounding shapes of the method 700). For example, the computing system 112 can determine based at least in part on input representation data comprising the input representation and/or the machine-learned model, an amount of overlap between the one or more bounding shapes.

At 1004, the method 1000 can include determining (e.g., determining based at least in part on the sensor data, the input representation, and/or the machine-learned model of the method 700) whether, when, or that, the amount of overlap between the one or more bounding shapes satisfies one or more overlap criteria. For example, the computing system 112 can use data including input representation data associated with the input representation to determine whether, when, or that the one or more overlap criteria have been satisfied. By way of further example, the computing system 112 can compare input representation data for different time intervals of the one or more time intervals to determine the one or more bounding shapes that overlap (e.g., occupy the same area).

Responsive to the one or more overlap criteria being satisfied, the method 1000 can proceed to 1006. Responsive to the one or more overlap criteria not being satisfied, the method 1000 can return to 1002 or end.

At 1006, the method 1000 can include, responsive to the amount of overlap between the one or more bounding shapes satisfying one or more overlap criteria, determining that the object of the one or more objects associated with the one or more bounding shapes that satisfies the one or more overlap criteria is the same object over the one or more time intervals. For example, the computing system 112 can determine that the object of the one or more objects associated with the one or more bounding shapes that satisfy the one or more overlap criteria is the same object over the one or more time intervals. For example, the computing system 112 can determine that when the intersection over union of two bounding shapes exceeds a predetermined threshold (e.g., 0.3), that the two bounding shapes enclose (e.g., partly or wholly enclose) the same object.

Figure 11:
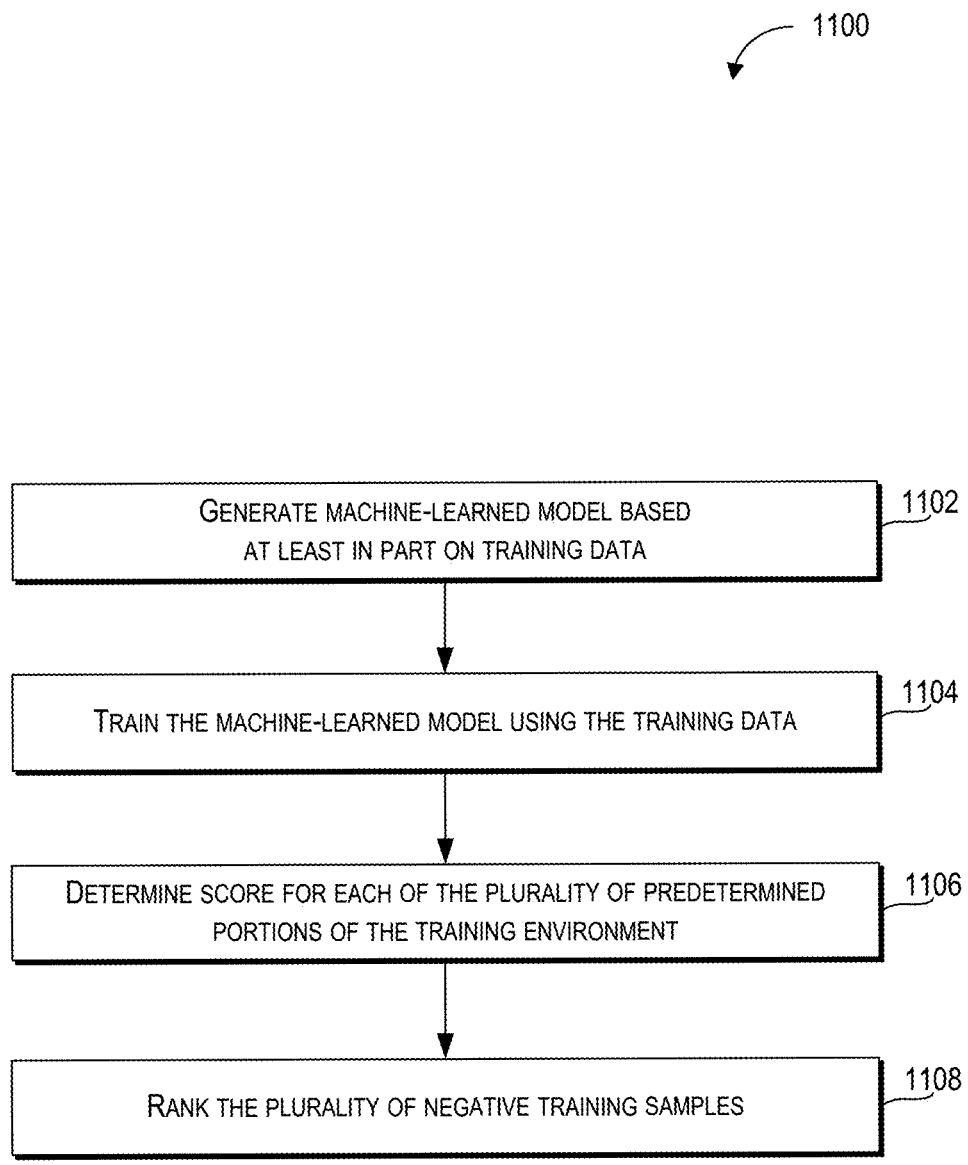
FIG. 11 depicts a flow diagram of an example method of training a machine-learned model according to example embodiments of the present disclosure.

FIG. 11 depicts a flow diagram of an example method of training a machine-learned model according to example embodiments of the present disclosure. One or more portions of a method 1100 can be implemented by one or more devices (e.g., one or more computing devices) or systems (e.g., one or more computing systems, one or more robotic systems, and/or one or more vehicle systems) including, for example, the operations computing system 104, the vehicle 108, or the computing system 112, shown in FIG. 1. Moreover, one or more portions of the method 1100 can be implemented as an algorithm on the hardware components of the devices described herein (e.g., as in FIG. 1) to, for example, detect, track, and/or predict one or more motion paths for one or more objects. FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. For example, in some embodiments, a computing system can select and perform only one of blocks 1102, 1104, or 1106 based on a selected severity level.

At 1102, the method 1100 can include generating the machine-learned model (e.g., the machine-learned model of the method 700) based at least in part on training data including a plurality of training objects associated with a plurality of classified features and/or a plurality of classified object labels. For example, the computing system 1210 and/or the machine-learning computing system 1250 can include, employ, and/or otherwise leverage a machine-learned object detection and prediction model. The machine-learned object detection and prediction model can be or can otherwise include one or more various models including, for example, neural networks (e.g., deep neural networks), or other multi-layer non-linear models. Neural networks can include convolutional neural networks, recurrent neural networks (e.g., long short-term memory recurrent neural networks), feed-forward neural networks, and/or other forms of neural networks.

At 1104, the method 1100 can include training the machine-learned model using the training data (e.g., a portion or subset of the training data) including the plurality of predefined portions of a training environment. For example, the computing system 112, the computing system 1250, and/or the machine-learning computing system 1270 can generate the machine-learned model based at least in part on training data including a plurality of training objects associated with a plurality of classified features and/or a plurality of classified object labels. As such, the training data can be used to train the machine-learned model. For example, a machine-learned model (e.g., the one or more machine-learned models 1230 and/or the one or more machine-learned models 1270) can receive input (e.g., training data) from one or more computing systems including the computing system 1210. Further, the machine-learned model can generate classified object labels based on the training data.

In some implementations, the models can be trained to account for interaction between the one or more objects. For instance, supervised training techniques can be performed to train the machine-learned models to detect and/or predict an interaction between one or more objects in an environment (e.g., one or more vehicles, pedestrians, buildings, and/or roads). The machine-learned models can process input data to predict an interaction associated with an object (e.g., a vehicle-object interaction and/or an object-object interaction). In some implementations, the computing system 1210 can provide input data indicative of a predicted interaction. Further, the training data can be used to train the machine-learned object detection and prediction model offline.

In some embodiments, the plurality of classified features can be based at least in part on point cloud data including a plurality of three-dimensional points associated with one or more physical characteristics of the plurality of training objects. For example, in some embodiments the training data can be based at least in part on sensor data (e.g., the sensor data of the method 700) that can include point cloud data (e.g., point cloud data based in part on one or more sensor outputs including LIDAR outputs) that includes a plurality of three-dimensional points (e.g., x, y, and z coordinates corresponding to physical dimensions including width, depth, and height) associated with one or more physical characteristics (e.g., physical dimensions, motion characteristics, sound characteristics) of the plurality of training objects.

In some embodiments, training the machine-learned model can include minimization of a combination of classification and regression loss. With respect to regression, the current time interval and one or more time intervals (e.g., n time intervals) predicted for the future can be used. For example, the loss function for classification loss and regression loss can be expressed as:

$$\ell(w) = \sum \left( a \cdot \ell_{cla}(w) + \sum_{i=t,t+1,\ldots,t+n} \ell^t_{reg}(w) \right)$$

In the above loss function for classification loss and regression loss, w can represent weighted parameters; α can represent a coefficient for the classification loss function $l_{cla}(w)$; t can represent a current time interval; and $l^t_{reg}(w)$ can represent a regression loss function.

Further, classification loss binary cross-entropy can be computed over locations and predefined boxes using a loss function expressed as:

$$\ell_{cla}(w) = \sum_{i,j,k} q_{i,j,k} \log p_{i,j,k}(w)$$

In the above loss function for classification loss binary cross-entropy, w can represent weighted parameters; i, j, and k can represent indices on feature map locations and pre-defined box identity, $q_{i,j,k}$ can represent the class label (e.g., $q_{i,j,k}$ can have a value of 1 for a vehicle and a value of 0 for a background); and $p_{i,j,k}$ can be the Predicted Probability for a Vehicle.

Determination of regression loss for detections and future predictions can be based at least in part on an associated ground truth. The correspondence of the pre-defined boxes can be determined based on matching each of the pre-defined boxes against a set of ground truth boxes. For example, for each predicted box, the ground truth box with the greatest overlap in terms of intersection over union (IoU) can be determined. If the IoU is greater than a predetermined threshold value (e.g., 0.3), the ground truth box can be assigned as $a^{-k}_{i,j}$ and the value 1 can be assigned to the corresponding label $q_{i,j,k}$. In some embodiments, regression targets can be defined as:

$$l_x = \frac{x - x^{GT}}{x^{GT}} \qquad l_y = \frac{y - y^{GT}}{y^{GT}}$$

$$s_w = \log\frac{w}{w^{GT}} \qquad s_h = \log\frac{s}{s^{GT}}$$

$$a_{sin} = \sin(\theta^{GT}) \qquad a_{cos} = \cos(\theta^{GT})$$

Furthermore, a weighted smooth L1 loss can be used over the regression targets. For example, weighted smooth L1 can be expressed as:

$$smooth_{L_1}(\hat{x}, x) = \begin{cases} \frac{1}{2}(\hat{x} - x)^2 & \text{if } |\hat{x} - x| < 1 \\ |\hat{x} - x| - \frac{1}{2} & \text{otherwise} \end{cases}$$

In some embodiments, to determine bounding shape locations for detected objects, the machine-learned model (e.g., the machine learned model 1230 and/or the machine-learned model 1270) can use a plurality of predefined portions of a training environment that includes multiple pre-defined shapes (e.g., pre-defined polygons and/or pre-defined boxes) for each feature map location in the feature maps used in the neural network. The multiple pre-defined boxes can correspond to actual physical dimensions (e.g., a pre-defined box can correspond to a square that is five meters on each side) and can have a variety of aspect ratios (e.g., 1:1, 1:2, 1:6). For example, there can be multiple pre-defined boxes per feature map location, which can be denoted as $a^k_{i,j}$, where i=1 . . . I, j=1 . . . J, is the location in the feature map and k=1 . . . K ranges over the predefined boxes (e.g., size and aspect ratio). To avoid 180 degree ambiguity, sin and cos values can be used. Further, for each pre-defined box $a^k_{i,j}$, the machine-learned model can predict corresponding normalized location offset $\hat{l}x$, $\hat{l}y$, log-normalized sizes $\hat{s}w$, $\hat{s}h$ and heading parameters $\hat{a}_{sin}$, $\hat{a}_{cos}$.

Furthermore, for example, the computing system 112, the computing system 1210, and/or the machine-learning computing system 1250 can train the machine-learned model using the training data (e.g., use the training data as an input for the machine-learned model) including the plurality of predefined portions of a training environment.

In some embodiments, each of the plurality of predefined portions of the training environment can be associated with at least one of a plurality of negative training samples or at least one of a plurality of positive training samples associated with a corresponding ground truth sample. For example, a set of training data comprising negative samples can be used as input for a machine-learned model (e.g., the machine-learning model 1230 and/or the machine-learned model 1270).

At 1106, the method 1100 can include determining, for each of the plurality of predefined portions of the training environment, a score (e.g., data including one or more values) associated with a probability of the predefined portion of the plurality of predefined portions being associated with one of the plurality of classified object labels. A higher score can be associated with a higher probability of the predefined portion of the plurality of predefined portions being associated with one of the plurality of classified object labels. For example, the computing system 112, the computing system 1250, and/or the machine-learning computing system 1270 can determine, for each of the plurality of predefined portions of the training environment, a score (e.g., score data including a numerical score value) associated with a probability (e.g., an estimate determined by the computing system 112, the computing system 1250, and/or the machine-learning computing system 1270) of the predefined portion of the plurality of predefined portions being associated with one of the plurality of classified object labels. Further, the computing system 112, the computing system 1250, and/or the machine-learning computing system 1270 can determine that one of the plurality of predefined portions of the training environment has an eighty-five percent (85%) probability of being associated with a pedestrian object label (e.g., the predefined portion of the training environment has an eighty-five percent probability of being a pedestrian).

At 1108, the method 1100 can include ranking the plurality of negative training samples based at least in part on the score for the respective one of the plurality of predefined portions of the training environment. For example, the computing system 112, the computing system 1250, and/or the machine-learning computing system 1270 can rank (e.g., arrange in ascending or descending order) negative training sample data associated with the plurality of negative training samples, based at least in part on the score for the respective one of the plurality of predefined portions of the training environment. Furthermore, using the negative training sample data, the computing system 112, the computing system 1250, and/or the machine-learning computing system 1270 can perform hard negative mining.

In some embodiments, the weighting of a filter (e.g., a kernel) of the machine-learned model can be based at least in part on a predetermined portion of the plurality of the negative samples associated with the lowest scores.

Figure 12:
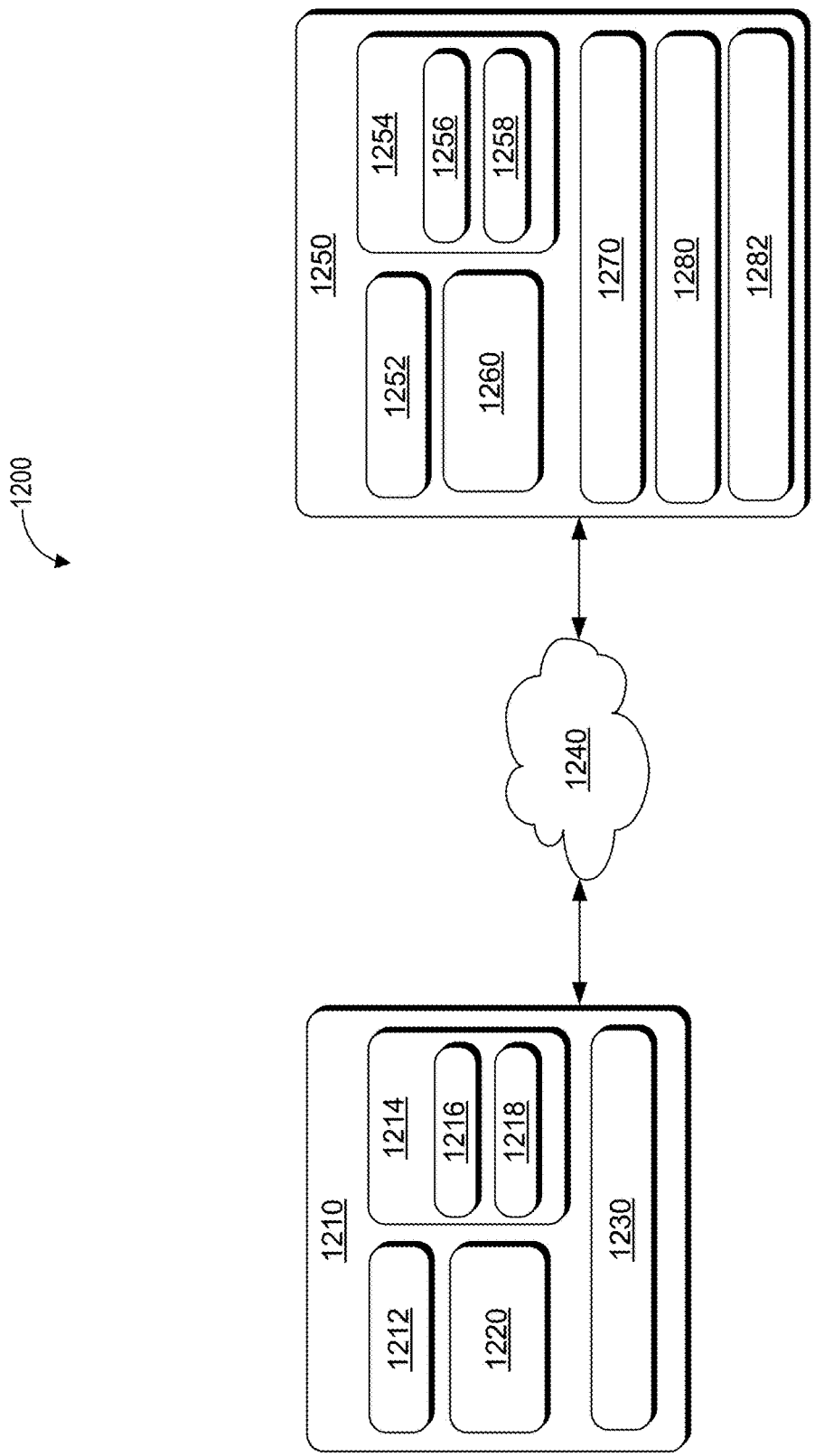
FIG. 12 depicts a diagram of an example system including a machine-learning computing system according to example embodiments of the present disclosure.

FIG. 12 depicts a block diagram of an example computing system 1200 according to example embodiments of the present disclosure. The example computing system 1200 includes a computing system 1210 and a machine-learning computing system 1250 that are communicatively coupled over a network 1240. Moreover, the example computing system 1200 can include one or more features, functions, devices, elements, and/or components of the system 100 and can perform one or more of the techniques, functions, and/or operations described herein.

In some implementations, the computing system 1210 can perform various operations including the determination of one or more states of a vehicle (e.g., the vehicle 108) including the vehicle's internal state, location, position, orientation, velocity, acceleration, and/or trajectory; the determination of one or more states of one or more objects inside the vehicle (e.g., one or more passengers and/or cargo of the vehicle); and/or the determination of the state of the environment proximate to the vehicle including the state of one or more objects proximate to the vehicle (e.g., the one or more objects physical dimensions, location, position, orientation, velocity, acceleration, trajectory, shape, color, and/or sound). In some implementations, the computing system 1210 can be included in a vehicle (e.g., autonomous vehicle). For example, the computing system 1210 can be on-board the vehicle. In other implementations, the computing system 1210 is not located on-board the vehicle. For example, the computing system 1210 can operate offline to determine one or more states of a vehicle (e.g., the vehicle 108) including the vehicle's location, position, orientation, velocity, acceleration, and/or trajectory; determine one or more states of one or more objects inside the vehicle (e.g., one or more passengers and/or cargo inside the vehicle); and/or determine the state of the environment external to the vehicle including the state of one or more objects proximate to the vehicle (e.g., the one or more objects physical dimensions, location, position, orientation, velocity, acceleration, trajectory, shape, color, and/or sound). Further, the computing system 1210 can include one or more distinct physical computing devices.

The computing system 1210 includes one or more processors 1212 and a memory 1214. The one or more processors 1212 can include any suitable processing device (e.g., a processing device including one or more of a processor core, a microprocessor, an application specific integrated circuit (ASIC), a field programmable gate array (FPGA), a controller, and/or a microcontroller) and can include one processor or a plurality of processors that are operatively connected. The memory 1214 can include one or more tangible non-transitory computer-readable storage media, including Random access memory (e.g., RAM), Read-only memory (ROM), electronically erasable programmable read-only memory (EEPROM), erasable programmable read-only memory (EPROM), non-volatile random access memory (NVRAM), one or more memory devices, flash memory devices, and/or any combinations thereof.

The memory 1214 can store information that can be accessed by the one or more processors 1212. For instance, the memory 1214 (e.g., one or more tangible non-transitory computer-readable storage mediums, memory devices) can store data 1216 that can be obtained, received, accessed, written, manipulated, created, and/or stored. The data 1216 can include, for instance, data associated with the state of a vehicle; the environment external to the vehicle (e.g., the state of one or more objects external to the vehicle); and/or a motion plan for the vehicle as described herein. In some implementations, the computing system 1210 can obtain data from one or more memory devices that are remote from the system 1210.

The memory 1214 can also store computer-readable instructions 1218 that can be executed by the one or more processors 1212. The instructions 1218 can be software written in any suitable programming language or can be implemented in hardware. Additionally, or alternatively, the instructions 1218 can be executed in logically and/or virtually separate threads on the one or more processors 1212.

For example, the memory 1214 can store instructions 1218 that when executed by the one or more processors 1212 cause the one or more processors 1212 to perform any of the operations and/or functions described herein, including, for example, determining the state of a vehicle (e.g., the vehicle 108); determining the state of the environment external to the vehicle (e.g., the physical dimensions of one or more objects in the environment external to the vehicle); and or generating a motion plan for the vehicle.

According to an aspect of the present disclosure, the computing system 1210 can store or include one or more machine-learned models 1230. As examples, the one or more machine-learned models 1230 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1210 can receive the one or more machine-learned models 1230 from the machine-learning computing system 1250 over the network 1240 and can store the one or more machine-learned models 1230 in the memory 1214. The computing system 1210 can then use or otherwise implement the one or more machine-learned models 1230 (e.g., by the one or more processors 1212). In particular, the computing system 1210 can implement the one or more machine-learned models 1230 to determine a state of a system including a computing system (e.g., the computing system 112), a robotic system, a vehicle (e.g., the vehicle 108); determine a state of the environment external to the system (e.g., the physical dimensions of one or more objects in the environment external to the vehicle); detect, recognize, and/or classify one or more objects in the environment external to the system; determine one or more locations of one or more objects in the environment external to the system; predict one or more paths of the one or more objects external to the system; and/or generate a motion plan for the system (e.g., a motion plan for a vehicle).

The machine-learning computing system 1250 includes one or more processors 1252 and a memory 1254. The one or more processors 1252 can be any processing device (e.g., a processing device including one or more of a processor core, a microprocessor, an ASIC, a FPGA, a controller, and/or a microcontroller) and can be one processor or a plurality of processors that are operatively connected. The memory 1254 can include one or more tangible non-transitory computer-readable storage media, such as RAM, ROM, EEPROM, EPROM, NVRAM, one or more memory devices, flash memory devices, and/or any combinations thereof.

The memory 1254 can store information that can be accessed by the one or more processors 1252. For instance, the memory 1254 (e.g., one or more tangible non-transitory computer-readable storage mediums, memory devices) can store data 1256 that can be obtained, received, accessed, written, manipulated, created, and/or stored. The data 1256 can include, for instance, information associated with a state of a computing system, the state of a robotic system, the state of a vehicle (e.g., the vehicle 108); a state of the environment external to the vehicle; and/or a motion plan for the vehicle as described herein. In some implementations, the machine-learning computing system 1250 can obtain data from one or more memory devices that are remote from the system 1250.

The memory 1254 can also store computer-readable instructions 1258 that can be executed by the one or more processors 1252. The instructions 1258 can be software written in any suitable programming language or can be implemented in hardware. Additionally, or alternatively, the instructions 1258 can be executed in logically and/or virtually separate threads on the one or more processors 1252.

For example, the memory 1254 can store instructions 1258 that when executed by the one or more processors 1252 cause the one or more processors 1252 to perform any of the operations and/or functions described herein, including, for example, determining a state of a system including a computing system (e.g., the computing system 112), determining the state of a robotic system, determining the state of a vehicle (e.g., the vehicle 108); determining a state of the environment external to the vehicle (e.g., the physical dimensions of one or more objects in the environment external to the vehicle); detecting, recognizing, and/or classifying one or more objects in the environment external to the vehicle; determining one or more locations of one or more objects in the environment external to the vehicle; predicting one or more paths of one or more objects external to the vehicle; and/or generating a motion plan for the vehicle.

In some implementations, the machine-learning computing system 1250 includes one or more server computing devices. In implementations in which the machine-learning computing system 1250 includes multiple server computing devices, such server computing devices can operate according to various computing architectures, including, for example, sequential computing architectures, parallel computing architectures, or some combination thereof.

In addition or alternatively to the one or more machine-learned models 1230 at the computing system 1210, the machine-learning computing system 1250 can include one or more machine-learned models 1270. As examples, the one or more machine-learned models 1270 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine-learning computing system 1250 can communicate with the computing system 1210 according to a client-server relationship. For example, the machine-learning computing system 1250 can implement the one or more machine-learned models 1270 to provide a web service to the computing system 1210. For example, the web service can provide a computing system, the state of a robotic system, the state of a vehicle (e.g., the vehicle 108); a state of the environment external to the vehicle; and/or a motion plan associated with the vehicle.

Further, the one or more machine-learned models 1230 can be located and used at the computing system 1210 and/or one or more machine-learned models 1270 can be located and used at the machine-learning computing system 1250. In some implementations, the machine-learning computing system 1250 and/or the computing system 1210 can train the one or more machine-learned models 1230 and/or the one or more machine-learned models 1270 through use of a model trainer 1280. The model trainer 1280 can train the one or more machine-learned models 1230 and/or the one or more machine-learned models 1270 using one or more training or learning algorithms. One example training technique is backwards propagation of errors. In some implementations, the model trainer 1280 can perform supervised training techniques using a set of labeled training data. In other implementations, the model trainer 1280 can perform unsupervised training techniques using a set of unlabeled training data. The model trainer 1280 can perform a number of generalization techniques to improve the generalization capability of the models being trained. Generalization techniques include weight decays, dropouts, or other techniques.

In particular, the model trainer 1280 can train a machine-learned model 1230 and/or the one or more machine-learned models 1270 based on a set of training data 1282. The training data 1282 can include, for example, a plurality of objects including vehicle objects, pedestrian objects, passenger objects, cyclist objects, road sign objects, road marker objects, traffic light objects, building objects, wall objects, cargo objects, furniture objects, and/or road objects. The model trainer 1280 can be implemented in hardware, firmware, and/or software controlling one or more processors.

The computing system 1210 can also include a network interface 1220 used to communicate with one or more systems or devices, including systems or devices that are remotely located from the computing system 1210. The network interface 1220 can include any circuits, components, and/or software, for communicating with one or more networks (e.g., the network 1240). In some implementations, the network interface 1220 can include, for example, one or more of a communications controller, receiver, transceiver, transmitter, port, conductors, software and/or hardware for communicating data. Similarly, the machine-learning computing system 1250 can include a network interface 1260.

The network 1240 can be any type of one or more network or combination of networks that allows for communication between devices. In some embodiments, the one or more networks can include one or more of a local area network, wide area network, the Internet, secure network, cellular network, mesh network, peer-to-peer communication link and/or some combination thereof and can include any number of wired or wireless links. Communication over the network 1240 can be accomplished, for instance, via a network interface using any type of protocol, protection scheme, encoding, format, and/or packaging.

FIG. 12 illustrates one example computing system 1200 that can be used to implement the present disclosure. Other computing systems can be used as well. For example, in some implementations, the computing system 1210 can include the model trainer 1280 and the training dataset 1282. In such implementations, the one or more machine-learned models 1230 can be both trained and used locally at the computing system 1210. As another example, in some implementations, the computing system 1210 is not connected to other computing systems.

In addition, components illustrated and/or discussed as being included in one of the computing systems 1210 or 1250 can instead be included in another of the computing systems 1210 or 1250. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of object detection, the computer-implemented method comprising:
receiving sensor data comprising information based at least in part on one or more sensor outputs associated with detection of an environment over one or more time intervals by one or more sensors, wherein the environment comprises one or more objects;

generating based at least in part on the sensor data, an input representation of the one or more objects, wherein the input representation comprises a temporal dimension and one or more spatial dimensions;

determining, based at least in part on one or more fusion criteria provided in data associated with the temporal dimension of the input representation, whether to aggregate temporal information associated with the temporal dimension at a first convolution layer of a plurality of convolution layers of a machine-learned model or to aggregate the temporal information associated with the temporal dimension over two or more convolution layers of the plurality of convolution layers of the machine-learned model;

determining based at least in part on the input representation and the machine-learned model, at least one of: (i) one or more detected object classes of the one or more objects, (ii) one or more locations of the one or more objects over the one or more time intervals, or (iii) one or more predicted paths of the one or more objects, wherein the machine-learned model aggregates the temporal information associated with the temporal dimension at the first convolution layer or aggregates the temporal information associated with the temporal dimension over two or more convolution layers of the machine-learned model, wherein aggregating the temporal information comprises reducing the one or more time intervals of the temporal dimension to one time interval in a manner that is determined based at least in part on the one or more fusion criteria; and generating, based at least in part on the input representation and the machine-learned model, output data comprising one or more bounding shapes corresponding to the one or more objects.

2. The computer-implemented method of claim 1, further comprising:

generating, based at least in part on the sensor data, a plurality of voxels corresponding to the environment comprising the one or more objects, wherein a height dimension of the plurality of voxels is used as an input channel of the input representation, and wherein the input representation is based at least in part on the plurality of voxels corresponding to one or more portions of the environment occupied by the one or more objects.

3. The computer-implemented method of claim 1, wherein the input representation comprises a tensor associated with a plurality of dimensions comprising the temporal dimension and the one or more spatial dimensions, the temporal dimension of the tensor associated with the one or more time intervals, and the one or more spatial dimensions of the tensor comprising a width dimension, a depth dimension, or a height dimension that is used as an input channel for the machine-learned model.

4. The computer-implemented method of claim 3, wherein the input representation is input to the first convolution layer of the plurality of convolution layers of the machine-learned model, and wherein weights of a plurality of feature maps for the plurality of convolution layers are shared between the plurality of convolution layers.

5. The computer-implemented method of claim 4, further comprising:

aggregating the temporal information to the tensor subsequent to aggregating spatial information associated with the one or more spatial dimensions to the tensor, wherein the temporal information is aggregated as the input representation is processed by the plurality of convolution layers, and wherein the temporal information is associated with the temporal dimension of the tensor.

6. The computer-implemented method of claim 1, wherein the fusion criteria provided in data associated with the temporal dimension of the input representation comprises a flag signaling whether to aggregate temporal information associated with the temporal dimension at the first convolution layer of the plurality of convolution layers of the machine-learned model or to aggregate the temporal information associated with the temporal dimension over the two or more convolution layers of the plurality of convolution layers of the machine-learned model.

7. The computer-implemented method of claim 6, wherein aggregating the temporal information comprises:

reducing the one or more time intervals of the temporal dimension to one time interval by performing a one-dimensional convolution on the temporal information associated with the temporal dimension.

8. The computer-implemented method of claim 1, wherein aggregating the temporal information comprises:

reducing the one or more time intervals of the temporal dimension to one time interval by performing a two-dimensional convolution on the temporal information associated with the temporal dimension.

9. The computer-implemented method of claim 1, further comprising:

activating, based at least in part on the output data, one or more systems comprising mechanical systems, one or more electromechanical systems, or one or more electronic systems, associated with operation of a manually operated vehicle, an autonomous vehicle, or one or more robotic systems.

10. The computer-implemented method of claim 1, further comprising:

determining one or more travelled paths of the one or more objects based at least in part on one or more locations of the one or more objects over a sequence of the one or more time intervals comprising a last time interval associated with a current time and the one or more time intervals prior to the current time, wherein the one or more predicted paths of the one or more objects is based at least in part on the one or more travelled paths.

11. The computer-implemented method of claim 10, further comprising:

detecting an object of the one or more objects that is at least partly occluded; and determining, based at least in part on the one or more travelled paths of the one or more objects, a time associated with the object of the one or more objects that is at least partly occluded being detected.

12. The computer-implemented method of claim 1, wherein the one or more sensor outputs comprise one or more three-dimensional points corresponding to a plurality of surfaces of the one or more objects detected by the one or more sensors.

13. The computer-implemented method of claim 1, wherein the sensor data is associated with a birds eye view vantage point, the one or more sensors comprising one or more light detection and ranging devices (LIDAR), one or more cameras, one or more radar devices, one or more sonar devices, or one or more thermal sensors.

14. One or more tangible non-transitory computer-readable media storing computer-readable instructions that are executable by one or more processors to cause the one or more processors to perform operations, the operations comprising:

receiving sensor data comprising information based at least in part on one or more sensor outputs associated with detection of an environment over one or more time intervals by one or more sensors, wherein the environment comprises one or more objects;

generating, based at least in part on the sensor data, an input representation of the one or more objects, wherein the input representation comprises a temporal dimension and one or more spatial dimensions;

determining, based at least in part on one or more fusion criteria provided in data associated with the temporal dimension of the input representation, whether to aggregate temporal information associated with the temporal dimension at a first convolution layer of a plurality of convolution layers of a machine-learned model or aggregate the temporal information associated with the temporal dimension over two or more convolution layers of the plurality of convolution layers of the machine-learned model;

determining, based at least in part on the input representation and the machine-learned model, at least one of (i) one or more detected object classes of the one or more objects, (ii) one or more locations of the one or more objects over the one or more time intervals, or (iii) one or more predicted paths of the one or more objects, wherein the machine-learned model aggregates the temporal information associated with the temporal dimension at the first convolution layer or aggregates the temporal information associated with the temporal dimension over two or more convolution layers of the machine-learned model, wherein aggregating the temporal information comprises reducing the one or more time intervals of the temporal dimension to one time interval in a manner that is determined based at least in part on the one or more fusion criteria; and generating, based at least in part on the input representation and the machine-learned model, an output comprising one or more bounding shapes corresponding to the one or more objects.

15. The one or more tangible non-transitory computer-readable media of claim 14, further comprising:

generating the machine-learned model based at least in part on training data comprising a plurality of training objects associated with a plurality of classified features and a plurality of classified object labels, the plurality of classified features based at least in part on point cloud data comprising a plurality of three-dimensional points associated with one or more physical characteristics of the plurality of training objects.

16. The one or more tangible non-transitory computer-readable media of claim 15, further comprising:

training the machine-learned model using the training data comprising a plurality of predefined portions of a training environment, wherein the plurality of predefined portions of the training environment are associated with at least one of a plurality of negative training samples or at least one of a plurality of positive training samples associated with a corresponding ground truth sample; and determining, for the plurality of predefined portions of the training environment, a score associated with a probability of the predefined portion of the plurality of predefined portions being associated with one of the plurality of classified object labels; and ranking the plurality of negative training samples based at least in part on the score for the respective one of the plurality of predefined portions of the training environment, wherein a weighting of a filter of the machine-learned model is based at least in part on a predetermined portion of the plurality of the negative samples associated with the lowest scores.

17. A computing device comprising:

one or more processors;

a memory comprising one or more computer-readable media, the memory storing computer-readable instructions that are executable by the one or more processors to cause the one or more processors to perform operations comprising:

receiving sensor data comprising information based at least in part on one or more sensor outputs associated with detection of an environment over one or more time intervals by one or more sensors, wherein the environment comprises one or more objects;

generating, based at least in part on the sensor data, an input representation of the one or more objects, wherein the input representation comprises a temporal dimension and one or more spatial dimensions;

determining, based at least in part on one or more fusion criteria provided in data associated with the temporal dimension of the input representation, whether to aggregate temporal information associated with the temporal dimension at a first convolution layer of a plurality of convolution layers of a machine-learned model or to aggregate the temporal information associated with the temporal dimension over two or more convolution layers of the plurality of convolution layers of the machine-learned model;

determining, based at least in part on the input representation and the machine-learned model, at least one of (i) one or more detected object classes of the one or more objects, (ii) one or more locations of the one or more objects over the one or more time intervals, or (iii) one or more predicted paths of the one or more objects, wherein the machine-learned model aggregates the temporal information associated with the temporal dimension at the first convolution layer or aggregates the temporal information associated with the temporal dimension over two or more convolution layers of the machine-learned model, wherein aggregating the temporal information comprises reducing the one or more time intervals of the temporal dimension to one time interval in a manner that is determined based at least in part on the one or more fusion criteria; and generating, based at least in part on the input representation and the machine-learned model, an output comprising one or more bounding shapes corresponding to the one or more objects.

18. The computing device of claim 17, wherein the machine-learned model is based at least in part on one or more classification techniques comprising a convolutional neural network.

19. The computing device of claim 17, further comprising:

determining, based at least in part on the input representation and the machine-learned model, an amount of overlap between the one or more bounding shapes; and responsive to the amount of overlap between the one or more bounding shapes satisfying one or more overlap criteria, determining that the object of the one or more objects associated with the one or more bounding shapes that satisfies the one or more overlap criteria is the same object over the one or more time intervals.

\* \* \* \* \*